(12) United States Patent
Nakagawa et al.

(10) Patent No.: US 7,892,663 B2
(45) Date of Patent: Feb. 22, 2011

(54) PERPENDICULAR MAGNETIC RECORDING MEDIA AND MAGNETIC STORAGE APPARATUS USING THE SAME

(75) Inventors: Hiroyuki Nakagawa, Kanagawa (JP); Ryoko Araki, Tokyo (JP); Naoto Ito, Kanagawa (JP); Takayuki Ichihara, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 343 days.

(21) Appl. No.: 12/156,317

(22) Filed: May 30, 2008

(65) Prior Publication Data

US 2009/0052074 A1 Feb. 26, 2009

(30) Foreign Application Priority Data

Aug. 21, 2007 (JP) ............................. 2007-215196

(51) Int. Cl.
G11B 5/65 (2006.01)

(52) U.S. Cl. ..................... 428/829; 428/836.2; 360/131

(58) Field of Classification Search ....................... None
See application file for complete search history.

(56) References Cited

U.S. PATENT DOCUMENTS

| | | | | |
|---|---|---|---|---|
| 7,226,674 B2 * | 6/2007 | Koda et al. | ................... | 428/829 |
| 7,470,474 B2 * | 12/2008 | Sakawaki et al. | ............ | 428/829 |
| 2006/0121319 A1 * | 6/2006 | Wu et al. | ................. | 428/836.2 |
| 2006/0139799 A1 | 6/2006 | Wu et al. | | |
| 2006/0204791 A1 | 9/2006 | Sakawaki et al. | | |
| 2006/0222902 A1 * | 10/2006 | Mukai | ........................ | 428/827 |

FOREIGN PATENT DOCUMENTS

| | | |
|---|---|---|
| JP | 2004-025943 A | 1/2004 |
| JP | 2006-302426 A | 11/2006 |

OTHER PUBLICATIONS

Zheng et al. "Role of Oxygen Incorporation in Co-Cr-Pt-Si-O Perpendicular Magnetic Recording Media," IEEE Transaction on Magnetics 40:2498-2500 (Jul. 2004).

* cited by examiner

*Primary Examiner*—Kevin M Bernatz
(74) *Attorney, Agent, or Firm*—Zilka-Kotab, PC

(57) ABSTRACT

Embodiments of the present invention provide a perpendicular magnetic recording media having excellent resolution, signal to noise ratio (S/N), and a small adjacent track erasure. According to one embodiment, underlayers for controlling the orientation and segregation of a magnetic layer, a magnetic layer including an oxide and an alloy of magnetic materials mainly composed of Co, Cr, and Pt, and a ferromagnetic-metal layer which does not contain oxygen, are formed over a substrate. The magnetic layer has at least two layers including ferromagnetic grains and oxides, a first magnetic layer, which is the part of the magnetic layer closer to the substrate, has grain boundaries mainly composed of Cr oxide and at least one oxide selected from Si, Ti, Nb, and Ta, and grain boundaries of a second magnetic layer at the ferromagnetic-metal layer side includes at least one oxide selected from Si, Ti, Nb, and Ta in which Cr oxide is less than the first magnetic layer.

19 Claims, 16 Drawing Sheets

Crystal grain
Grain boundary

The Sum of the elements concentration which constitute the Cr oxides of the second magnetic layer (at.%)

Fig.18
(a)
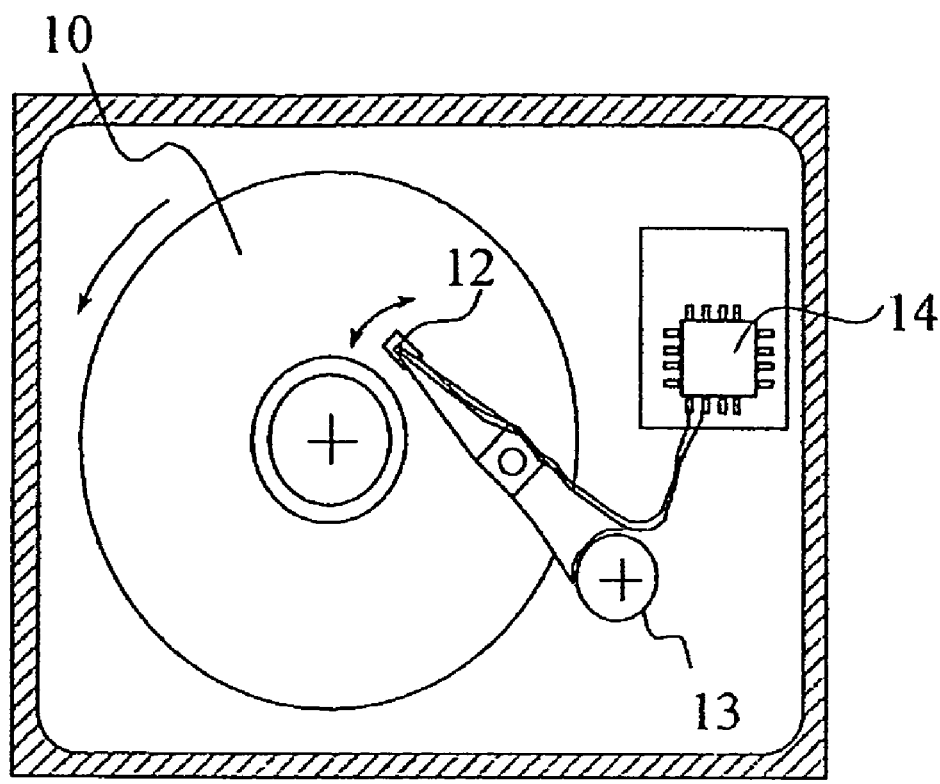
(b)
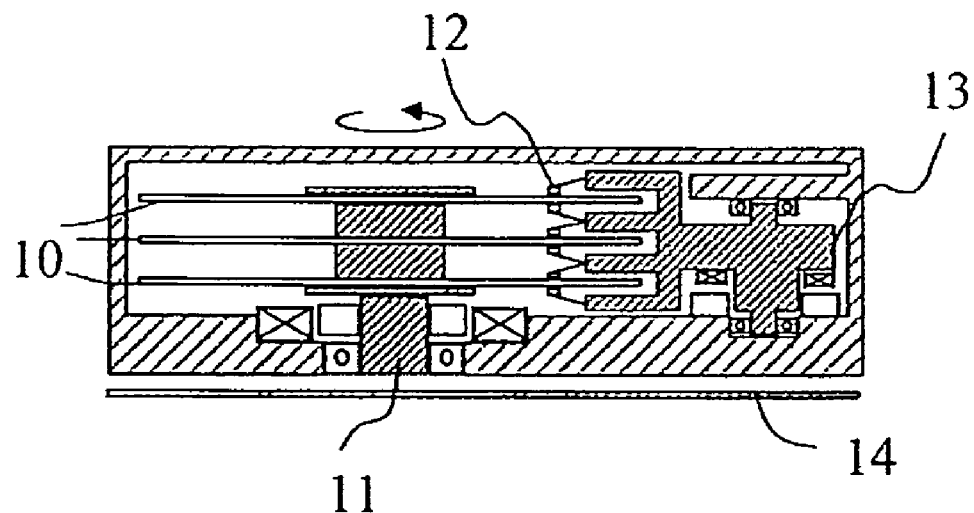

PERPENDICULAR MAGNETIC RECORDING MEDIA AND MAGNETIC STORAGE APPARATUS USING THE SAME

CROSS-REFERENCE TO RELATED APPLICATION

The instant nonprovisional patent application claims priority to Japanese Patent Application No. 2007-215196 filed Aug. 21, 2007 and which is incorporated by reference in its entirety herein for all purposes.

BACKGROUND OF THE INVENTION

In recent years, since the amount of information processed by a computer has been increasing, there has been a strong demand for an increase in the capacity of a hard disk drive as an auxiliary storage apparatus. Moreover, hard disk drives have come to be mounted inside domestic electric products, and the demand for downsizing the hard disk drive and increasing the capacity becomes even stronger.

In a longitudinal magnetic recording system conventionally used for a hard disk drive, since magnetizations recorded in the medium are adjacent to each other and face in opposite directions, in order to increase the linear recording density it is necessary not only to increase the coercivity of the recording layer but also to decrease the film thickness. However, a problem arises that the write-ability of the write head becomes insufficient with increasing coercivity of the recording layer, and a problem arises that recorded information is lost by thermal fluctuation with decreasing thickness of the recording layer; thereby, it becomes difficult to improve the areal recording density using a longitudinal magnetic recording system. In order to solve these problems, there has been active development of a hard disk drive using a perpendicular magnetic recording system. The perpendicular magnetic recording system is a method whereby a recorded bit is formed such that magnetization of the recording medium is perpendicular to the medium face and the magnetizations in adjacent recorded bits are antiparallel, thus making it possible to decrease the medium noise because a demagnetization field in the magnetic transition region is small compared with a longitudinal magnetic recording system and it is possible to stably maintain the recorded magnetization during high density recording. Moreover, a method has been proposed where a double-layer perpendicular magnetic recording medium which includes a soft-magnetic underlayer working as a return-path of flux between the perpendicular magnetic recording medium and the substrate is combined with a single-pole-type head (a so-called SPT head). A magnetic head (a so-called TS head) has been further proposed where a magnetic shield is provided through a non-magnetic gap layer at the trailing side of a main pole in order to improve the write-field gradient.

A structure has been proposed for a magnetic recording layer of perpendicular magnetic recording media where magnetic grains are magnetically decoupled by segregating a non-magnetic compound such as an oxide and a nitride around the magnetic grains (a so-called granular structure). For example, "Role of Oxygen Incorporation in Co—Cr—Pt—Si—O Perpendicular Magnetic Recording Media" IEEE Transactions on Magnetics, Vol. 40, No. 4, July 2004, pp. 2498-2500, discloses a method for forming a recording layer having a granular structure by using a composite target containing a CoCrPt alloy and $SiO_2$ and by using a DC magnetron sputtering technique in an argon-oxygen mixed gas atmosphere.

As a means for lowering the noise of a medium and improving the SNR, Japanese Patent Publication No. 2006-302426 ("Patent Document 1") discloses a magnetic recording layer having a granular structure which includes Co, Cr, Pt, Si, and O, the magnetic grain size practically constant in the film thickness direction, and a region where the interface side with the intermediate layer contains more oxygen than the surface layer. Japanese Patent Publication No. 2004-025943 ("Patent Document 2") discloses that a recording layer is formed of two or more magnetic layers having different oxide contents, crystal grains in the lowermost layer of the recording layer being made minute by making the oxide content of the magnetic layer largest at the side closest to the substrate, and a magnetic layer is laminated thereon where the crystal grains are larger than the crystal grains of the lowermost layer. Japanese Patent Publication No. 2004-310910 ("Patent Document 3") discloses that a Co—Cr alloy layer which does not include oxide is laminated over a recording layer having a granular structure where an oxide is segregated to the grain boundaries. In addition, Patent Publication No. 2006-309919 ("Patent Document 4") discloses a technique where a magnetic layer is formed of two or more layers having a granular structure and the lower magnetic layer has a greater non-magnetic and immiscible atomic concentration than the upper magnetic layer.

BRIEF SUMMARY OF THE INVENTION

Embodiments of the present invention provide a perpendicular magnetic recording media having excellent resolution, signal to noise ratio (S/N), and a small adjacent track erasure. According to the particular embodiment of FIG. 1, underlayers 42, 43, and 44 for controlling the orientation and segregation of a magnetic layer, a magnetic layer 45 including an oxide and an alloy of magnetic materials mainly composed of Co, Cr, and Pt, and a ferromagnetic-metal layer 46 which does not contain oxygen, are formed over a substrate 41. The magnetic layer 45 has at least two layers including ferromagnetic grains and oxides, the first magnetic layer 451, which is the part of the magnetic layer closer to the substrate, has grain boundaries mainly composed of Cr oxide and at least one oxide selected from Si, Ti, Nb, and Ta, and grain boundaries of the second magnetic layer 452 at the ferromagnetic-metal layer side includes at least one oxide selected from Si, Ti, Nb, and Ta in which Cr oxide is less than the first magnetic layer.

BRIEF DESCRIPTION OF THE DRAWINGS

FIGS. 18(a) and 18(b) are cross-sectional schematic drawings illustrating a magnetic storage apparatus.

DETAILED DESCRIPTION OF THE INVENTION

Figure 1:
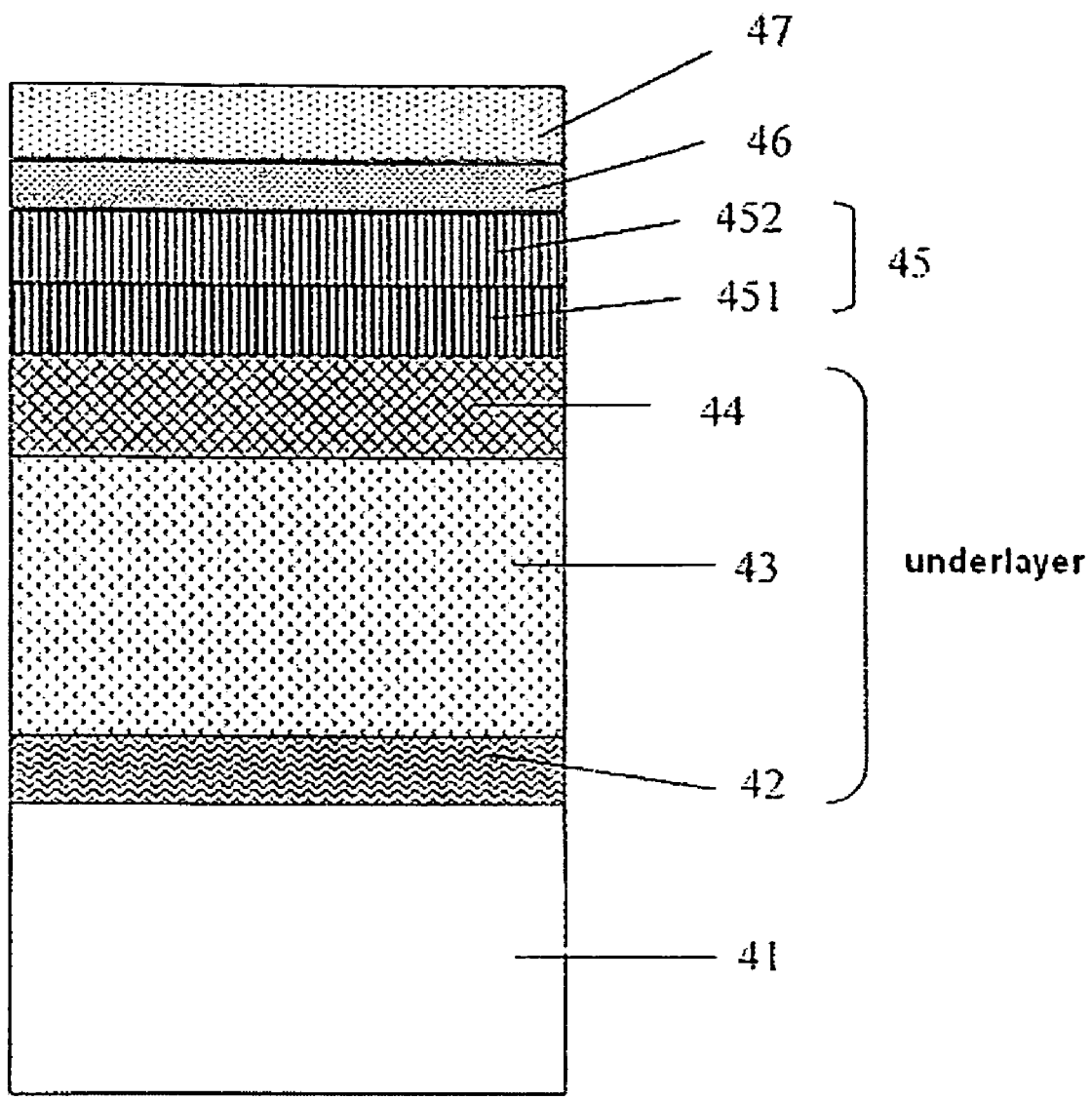
FIG. 1 is a cross-sectional schematic drawing illustrating perpendicular magnetic recording media according to embodiments of the present invention.

Embodiments of the present invention relate to perpendicular magnetic recording media which is able to record a large volume of information, and a magnetic storage apparatus using the perpendicular magnetic recording media.

The art previously described aims to improve the magnetic properties and the recording performance by segregating non-magnetic oxides to the grain boundaries in order to magnetically isolate the magnetic grains, make the grain size smaller, and improve the initial layer of the magnetic layer. However, as described in non-patent document 1, although the average magnetic cluster size (intergranular exchange coupling) is decreased only by increasing the oxygen content uniformly in the magnetic layer and making a Cr oxide segregate to the grain boundaries, there has been a problem that resolution is deteriorated by increasing the switching field distribution; the write-ability is deteriorated with increasing coercivity, and recording becomes difficult.

According to Patent Documents 1 and 2, when a initial layer of the magnetic layer is formed by using a target having a high $SiO_2$ concentration which has a high free energy for oxide formation and a low Cr concentration, the average crystal grain size decreases. However, the grain boundary does not spread uniformly; many subgrains having narrow grain boundaries are formed, and dispersion is generated in the exchange coupling, resulting in the magnetic cluster size not being made smaller even if the crystal grain size is made smaller, so that a problem arises and further improvement of the areal recording density becomes difficult. Moreover, the magnetic anisotropy of partially isolated magnetic grains becomes very large because of the small amount of Cr, so that a problem arises and recording by the head cannot be adequately performed. Moreover, if a ferromagnetic-metal layer is only laminated on a magnetic layer having a granular structure as described in Patent Documents 3 and 4, it becomes necessary to increase the thickness of the ferromagnetic-metal layer in order to obtain sufficient OW properties while enhancing segregation of the granular magnetic layer and decreasing exchange coupling. As a result, there has been a trade-off relationship where improvement of the SNR is saturated because of a large deterioration of the resolution.

The inventors focused attention on a structure at the early stage of growth in the ferromagnetic-metal layer and investigated the crystal structure in detail by using a TEM. As a result, the inventors found out that, when grain boundary width of the granular magnetic layer becomes larger, the ferromagnetic-metal layer has grain boundaries which reflect the grain boundary structure of the granular layer at the stage where it is thin and the film thickness of the ferromagnetic-metal layer which comes to have a continuous structure becomes thicker, and that uniform exchange coupling cannot be introduced in the crystal grains of the granular magnetic layer because the ferromagnetic-metal layer has a discontinuous stricture when it is thin, so that neither the decrease in the switching field distribution nor the effect of decreasing switching field intensity can be obtained. Moreover, a problem was newly found where, since the ferromagnetic metallic film has extremely stronger exchange coupling in the film compared with the granular film, the magnetic cluster size increases rapidly although the switching field distribution is decreased with an increase in the film thickness, so that noise increases rapidly at a high linear recording density and the bit error rate at the adjacent track is rapidly deteriorated when a signal is recorded in a track (adjacent track erasure).

Embodiments of the present invention have been performed on the basis of such observations, and it is an objective of embodiments of the present invention to provide perpendicular magnetic recording media, a manufacturing method thereof, and a magnetic storage apparatus in which the exchange coupling in the initial layer of the magnetic layer is decreased, the average switching field intensity and switching field distribution are suppressed, low noise and high resolution of the medium are combined, and adjacent track erasure is small with excellent S/N.

Perpendicular magnetic recording media of embodiments of the present invention include an underlayer provided over a substrate, a magnetic layer which is formed over the underlayer, where the magnetic layer has columnar magnetic grains mainly comprising Co, Cr, and Pt and oxides, and a ferromagnetic-metal layer which is formed over the magnetic layer and does not contain an oxide, where the magnetic layer includes at least two layers which are a first magnetic layer at the underlayer side and a second magnetic layer at the ferromagnetic-metal layer side, grain boundaries of the first magnetic layer being composed of a Cr oxide and at least one oxide selected from Si, Ti, Nb, and Ta, grain boundaries of the second magnetic layer including at least one oxide selected from Si, Ti, Nb, and Ta, and the sum of the element concentrations of Cr element and oxygen element contained in the Cr oxide is smaller than the first magnetic layer and less than 5 at. %.

At this time, the grain boundary width of the second magnetic layer becomes smaller than the grain boundary width of the first magnetic layer. The sum of the element concentrations of Cr and oxygen contained in the Cr oxide may be 4.3 at. % or less in the region of film thickness of about 2 nm from the interface of the second magnetic layer at the ferromagnetic-metal layer side, and that the sum of the element concentrations of Cr and oxygen contained in the Cr oxide be 7 at. % or more and 20 at. % or less in the region of film thickness of about 4 nm from the interface of the first magnetic layer at the substrate side. Moreover, the total amount of each element contained in the oxide of the second magnetic layer may be 3.6 at. % or more and 13 at. % or less, and the total amount of each element contained in the oxide of the first magnetic layer may be 15 at. % or more and 30 at. % or less.

It is not necessary that the magnetic layer have a clear layer structure and it is only necessary that the Cr oxide contained in the grain boundaries has a concentration gradient in the film thickness direction and the sum of the element concentrations of Cr element and oxygen contained in Cr oxide at the ferromagnetic-metal layer is smaller than that at the substrate side and less than 5 at. %.

Embodiments of the invention make it possible to not only decrease average exchange coupling and average switching field intensity when recording is performed by a head but also decrease dispersion of the exchange coupling and switching field distribution. As a result, the medium noise can be decreased compared with the prior art and the resolution can be improved; thereby, improvement of the S/N ratio becomes possible. Moreover, by decreasing the ferromagnetic-metal layer thickness which has a strong exchange coupling, the track pitch density can be improved and the tolerance of the adjacent track erasure can be improved. Since the surface roughness on the medium can be reduced, the reliability is also improved. As a result, high track pitch density and linear recording density can be combined, and perpendicular magnetic recording media and a magnetic storage apparatus using it can be provided where reliability is excellent and high density recording is possible.

In order to realize a low noise property, it is necessary to isolate crystal grains of the magnetic layer by widening the grain boundary width of the magnetic layer including the oxide and decrease the magnetic cluster size (exchange coupling). It is understood that many subgrains are formed and the grain boundary width is hard to expand uniformly when oxides of Si, Ti, Nb, and Ta, etc. which have a high free energy of oxide formation in order to increase the grain boundary width of the lower side of the magnetic layer (first magnetic layer) which includes the oxide. On the other hand, although Cr which has a low free energy of oxide formation is hard to forming grain boundaries uniformly by itself, it was found that Cr oxide preferentially segregated to the grain boundaries and wide grain boundaries are formed with making a trigger of the grain boundaries using oxides which have a high oxide free energy of oxide formation such as Si, Ti, Ta, and Nb, etc.

On the other hand, it is effective for decreasing dispersion of the magnetic cluster size and switching field distribution to introduce uniform exchange coupling between crystal grains of the magnetic layer through the ferromagnetic-metal layer.

The inventors discovered that an increase in the magnetic cluster size is suppressed to a minimum and uniform exchange coupling can be introduced between crystal grains of the magnetic layer by decreasing the grain boundary width of the upper side of the magnetic layer (second magnetic layer) containing an oxide and by controlling the grains of the ferromagnetic-metal layer grown on it to have a practically continuous structure from the early stage of growth. In order to achieve such a structure, it is important that an oxide of the upper layer of the magnetic layer (second magnetic layer) containing an oxide is an oxide of Si, Ti, Nb, or Ta, etc. which have a high free energy of oxide formation and a Cr oxide therein is controlled to be less than that of the lower layer. Although the grain boundary width becomes narrower by controlling the Cr oxide, which has an effect of increasing the grain boundary width, to be less at the upper layer of the magnetic layer, the grain boundary width gradually decreases uniformly reflecting the grain boundaries of the lower layer by the presence of an oxide of Si, Ti, Nb, or Ta, etc., so that crystal grains of the ferromagnetic-metal layer can be easily grown over these grain boundaries. At this time, in the upper layer side of the magnetic layer containing an oxide, exchange coupling which is weaker than the ferromagnetic-metal layer but uniform, works together with a uniform decrease in the grain boundary width, resulting in a contribution to a decrease in the switching field distribution and the average switching field intensity.

By growing crystal grains of the ferromagnetic-metal layer over the grain boundaries, growth of ferromagnetic grains on grains of the second magnetic layer in a one-to-one relationship can be suppressed, uniform exchange coupling can be introduced between grains of the second magnetic layer by growing them in a one-to-many or many-to-one relationship, and dispersion of the cluster size and the switching field distribution can be decreased. More preferable is a stricture where a plurality of ferromagnetic grains is grown over second magnetic grains. It was discovered by making such a structure that the film thickness of the ferromagnetic-metal layer can be suppressed to a minimum, resulting in the resolution being improved, and that an increase in the magnetic cluster size can be suppressed to a minimum, resulting in an increase in noise at a high linear recording density and adjacent track erasure being suppressed.

As the first magnetic layer, a granular film can be used which includes Co as a main component, contains at least Cr and Pt, and contains an oxide, and which includes a Co—Cr—Pt—B alloy, a Co—Cr—Pt—Mo alloy, a Co—Cr—Pt—Nb alloy, a Co—Cr—Pt—Ta alloy, a Cr oxide, and least one or more selected from a Si oxide, a Ta oxide, a Nb oxide, and a Ti oxide. In order to form a uniform and wide grain boundaries which are sufficient to decrease the exchange coupling uniformly, the sum of the concentrations of Cr element and oxygen element contained in the first magnetic layer may be controlled to be 7 at. % or more and 20 at. % or less. At this time, uniform and wide grain boundaries are efficiently formed, the exchange coupling is uniformly decreased, and a low noise magnetic layer can be formed by controlling the total amount of each element included in oxides of Si, Ti, Nb, and Ta, which become a trigger for formation of grain boundary and which have high oxide formation reactivity, and Cr element and oxygen element included in a Cr oxide being from about 15 at. % to 30 at. %. The Cr oxide may be formed by a reactive sputtering technique under oxygen atmosphere and may be introduced in a target as a Cr oxide. Even if Cr oxide is introduced in a target, sputtering may be carried out in oxygen atmosphere in order to compensate for the oxygen deficiencies during sputtering.

Moreover, by applying a bias voltage of about −100 V to −300 V to the substrate, segregation of the oxide to the grain boundaries can be promoted.

In order to form a Cr oxide in the aforementioned range, the concentration of Cr and the concentration of Cr oxide included in the target are important. When it is introduced as Cr in a target, the Cr concentration against the total amount of Co, Cr, and Pr may be controlled to be 16 at. % or more and 25 at. % or less. If the Cr concentration is smaller than 16 at. %, oxidation of Co starts before obtaining sufficient Cr oxide with increasing the amount of oxygen for obtaining Cr oxide and the magnetic anisotropy is drastically degraded since the Cr concentration is low, therefore it is not preferable. Moreover, the Cr concentration of 25 at. % or more is not preferable since residual Cr which is not oxidized inside the crystal grains increases, and a decrease in the magnetic anisotropy results. More preferable is 19 at. % or more and 25 at. % or less.

In order to make a Cr oxide efficiently, it is necessary that an oxide which has a high oxide formation reactivity, such as an oxide of Si, Ti, Nb, and Ta, etc., contained in the target be made small in contrast to the case where grain boundaries are mainly composed of Si, Ti, Nb, and Ta, etc. as in the prior art. The reason is that oxygen mainly reacts with these elements and Cr oxide becomes difficult to form when a lot of oxides having a high free energy of oxide formation exist. When $SiO_2$ and $TiO_2$ are used, the concentration of these oxides included in the target may be controlled to be about from 4 mol % to 8 mol %, and, when $Nb_2O_5$ and $Ta_2O_5$ are used, it may be preferable to control the concentration of these oxides to be about from 1.5 mol % to 2.5 mol %.

Moreover the film thickness of the first magnetic layer should be set within a range where the thermal stability is satisfied, and a value from about 4 nm to 10 nm is usually used. Moreover, sufficient magnetic anisotropy can be obtained by controlling the Pt concentration against the total amount of Co, Cr, and Pt included in the first magnetic layer to be about from 15 at. % to 30 at. %, resulting in sufficient thermal stability being obtained.

As the second magnetic layer, a granular film can be used which includes Co as a main component, contains at least Cr and contains an oxide, and which includes a Co—Cr—Pt—B alloy, a Co—Cr—Pt—Mo alloy, a Co—Cr—Pt—Nb alloy, a Co—Cr—Pt—Ta alloy, and least one or more selected from a Si oxide, a Ta oxide, a Nb oxide, and a Ti oxide. Continuous growth of crystal grains of ferromagnetic-metal layer thereon can be promoted effectively by controlling the sum of concentrations of Cr element and oxygen element in the Cr oxide to be less than 5 at. %, which is included in the film thickness region of about 2 nm at the ferromagnetic-metal layer side of the magnetic layer which includes the oxide. 4.3 at. % or less is more preferable. The width of the grain boundaries of the second magnetic layer can be uniformly decreased by controlling the total amount of each element constituting the Cr oxide and the Si, Ti, Ta, and Nb oxides which are included in the second magnetic layer to be in a range from 3.6 at. % to 13 at. %, and the dispersion of the magnetic cluster size and the switching field distribution can be decreased by introducing uniform exchange coupling. When the second magnetic layer is formed, formation of Cr oxide is suppressed by sputtering in an atmosphere which includes less oxygen than that during formation of the first magnetic layer. The formation may be carried out in an atmosphere without oxygen because formation of a Cr oxide can be suppressed. When a Cr oxide is included in the target, the concentration of the Cr oxide should be less than the first magnetic layer. It is effective for decreasing the grain boundary width uniformly to use a target which contains hardly any Cr oxide and to decrease the gas pressure while forming the second magnetic layer.

A multilayer film such as Co/Pt and Co/Pd, etc. and an alloy which includes Co as a main component and includes at least Cr can be used as a material constituting the ferromagnetic-metal layer. Specifically, it is preferable if an alloy is used which includes Co as a main component and includes at least Cr, such as a Co—Cr alloy, a Co—Cr—B alloy, a Co—Cr—Mo ally, a Co—Cr—Nb alloy, a Co—Cr—Ta alloy, a Co—Cr—Pt—Cu alloy, a Co—Cr—Pt—B alloy, a Co—Cr—Pt—Mo alloy, a Co—Cr—Pt—Nb alloy, a Co—Cr—Pt—Ta alloy, a Co—Cr—Pt—Mo—B alloy, a Co—Cr—Pt—Nb—B alloy, a Co—Cr—Pt—Ta—B alloy, a Co—Cr—Pt—Cu—B alloy, since the increase in noise can be suppressed to a minimum, the switching field can be decreased, and the corrosion resistance can be improved. Moreover, the film thickness of the ferromagnetic-metal layer may be controlled to be as thin as possible in a range where the average switching field intensity and switching field distribution can be reduced and the thermal stability can be satisfied. Accordingly, the adjacent track erasure can be suppressed. The film thickness of the ferromagnetic-metal layer is preferably about from 1 nm to 5 nm.

A layer may be inserted between the ferromagnetic-metal layer and the magnetic layer including an oxide to control the exchange coupling between them. Ru, CoRu, CoCr—$SiO_2$, etc. may be used as a layer which controls the exchange coupling between the upper and lower layers.

The underlayer controlling the crystal orientation and segregation (crystal texture control and segregation promotion underlayer) plays an important role which controls the crystal orientation and crystal grain size of the recording layer and decreases the exchange coupling between the crystal grains of the recording layer. One only has to control the film thickness, configuration, and material of the crystal texture control and segregation promotion underlayer in a range where the aforementioned effects can be obtained. For instance, over a microcrystalline layer such as Ta, etc., an amorphous layer such as NiTa, etc. and a metal layer having a face-centered-cubic (fcc) structure, a configuration where Ru or a Ru alloy layer is formed and a configuration where a Ru alloy layer is formed over a Ti alloy layer through an fcc metal may be used.

The role of the microcrystalline layer such as Ta, etc., the amorphous layer such as NiTa, etc. and the metal layer having a face-centered-cubic lattice (fcc) structure is for the improvement of the c-axis orientation along the perpendicular direction of the Ru film surface. Specifically, since the control of grain size and roughness is excellent in an fcc metal compared with a microcrystalline material such as Ta, etc. and an amorphous material such as NiTa, etc., it is preferable to widely promote segregation of the recording layer and to improve the thermal stability. As a metal having a face-centered-cubic lattice (fcc) structure, Pd, Pt, Cu, Ni and an alloy including these may be used. Specifically, it is preferable to use an alloy which has Ni as a main component and includes W, Cr, and Cu because the appropriate grain size and roughness can be formed and segregation of the recording layer can be promoted. For instance, Ni-6 at. % W alloy, Ni-8 at. % W alloy, Ni-6 at. % V alloy, Ni-10 at. % Cr alloy, Ni-10 at. % Cr-6 at. % W alloy, Ni-10 at. % Cr-3 at. % Nb alloy, Ni-10 at. % Cr-3 at. % B alloy, Ni-20 at. % Cu alloy, Ni-20 at. % Cu-6 at. % W alloy, Ni-20 at. % Cu-3 at. % Ti alloy, and Ni-20 at. % Cu-3 at. % Ta alloy may be used. The film thickness is regularly controlled to be a value in a range from 2 nm to 12 nm.

Since the (111) orientation of the fcc layer can be improved, it is preferable to form an amorphous layer such as a Cr—Ti alloy, a Cr—Ta alloy, a Ni—Ta alloy, and an Al—Ti alloy, etc. underneath the fcc metal. The film thickness of the amorphous layer is normally controlled to be a value of about from 1 nm to 5 nm.

The roles of the Ru alloy layer are for controlling the crystal grain size and crystal orientation of the recording layer and for decreasing the exchange coupling between the crystal grains of the recording layer. One has to control the film thickness to be in a range where it is satisfied and a value of about from 3 nm to 30 nm is normally used. It is preferable that the Ru layer be formed separated into two layers or more, and the lower Ru layer be formed under a low gas pressure with a high deposition rate and the upper Ru layer formed under a high gas pressure with a low deposition rate, resulting in deterioration of the crystal orientation being suppressed and segregation of the recording layer being promoted. Ar and a gas where a small amount of oxygen and nitrogen are added to the Ar may be used as a sputter-gas. Moreover, it is preferable that the interface part with the recording layer side of the Ru layer be formed of a granular layer where an oxide and a nitride are surrounding the Ru because it promotes segregation of the magnetic layer. A granular film may be formed of an alloy which has Ru as a main component and which includes an element easily oxidized such as Si, B, Ti, Ta, and Nb by using a reactive sputtering technique under Ar gas to which small amount of oxygen and nitrogen are added, and a granular film may be formed by using a target where an oxide such as $SiO_2$, $TiO_2$, $Ta_2O_5$, and $Nb_2O_5$ is added to the Ru.

Hereafter, the embodiments for carrying out the invention will be explained in detail referring to the drawings.

Embodiment 1

FIG. 1 is a schematic cross-sectional drawing illustrating perpendicular magnetic recording media of embodiments of the present invention. This perpendicular magnetic recording was manufactured by using a sputtering apparatus (C-3010) manufactured by ANELVA CORPORATION LTD. This sputtering apparatus includes ten process chambers, one load/unload chamber, and each chamber is independently evacuated. All chambers were evacuated to a level of vacuum of $1 \times 10^{-5}$ Pa or less and the processes was performed, in order, by moving a carrier onto which a substrate was loaded into each process chamber. A rotary magnet magnetron sputtering cathode is installed in the process chamber for sputtering, and the metallic film and the carbon film were formed by using DC sputtering.

A glass substrate with a diameter of 63.5 mm was used for a substrate 41. In order to improve the adhesion to the substrate, a 10 nm thick adhesion layer 42 composed of a NiTa alloy was formed on the substrate 41. Herein, Ni-37.5 at. % Ta was used as a NiTa alloy. The adhesion layer 42 has to ensure the adhesion to both the substrate and the upper layer of the adhesion layer, and any of a Ni system alloy, a Co system alloy, and an Al system alloy can be used. For instance, an AlTi alloy, a NiAl alloy, a CoTi alloy, and an AlTa alloy may be used.

The soft-magnetic underlayer 43 thereon has a three-layer-structure where a FeCoTaZr alloy layers are stacked through a thin Ru. 51 at % Fe-34 at. % Co-10 at. % Ta-5 at. % Zr was used here for the FeCoTaZr alloy. Upper and lower FeCoTaZr alloy layers are antiferromagnetically coupled to each other through the Ru layer by taking a structure such as an AFC (antiferromagnetic coupling), resulting in noise caused by the soft-magnetic underlayer being decreased. At this time, the film thickness of Ru should be controlled in a range where AFC is ensured, and it is controlled to be 0.4 nm. Moreover, an additional element may be added in the Ru in a range where AFC is ensured. The film thickness of the FeCoTaZr alloy is controlled to be 15 nm per layer. As a configuration of the soft-magnetic underlayer, structures may be used where a pinning layer for pinning the magnetic domain of the soft-magnetic underlayer is provided underneath one soft-magnetic underlayer including a soft-magnetic material such as a FeCoTaZr alloy and where a pinning layer is provided underneath an AFC structure. Moreover, as a material constituting the soft-magnetic underlayer, a FeCoTaZr alloy, a FeCoTaZrCr alloy, a CoTaZr alloy, a CoTaZrCr alloy, a FeCoB alloy, a FeCoCrB alloy, a CoNbZr alloy, and a CoTaNb alloy may be used.

A crystal texture control and segregation promotion underlayer 44 has a structure where a 4 nm thick Ni-37.5 at. % Ta, an 8 nm thick Ni-6 at. % W, and a 16 nm thick Ru are formed in order. The crystal texture control and segregation promotion underlayer 44 controls the crystal orientation and crystal grain size of the recording layer and plays an important role for decreasing the exchange coupling between the crystal grains in the recording layer. The film thickness, the configuration, and the material of the crystal texture control and segregation promotion underlayer 44 should be controlled in a range where the aforementioned effects can be obtained, and it is not limited to the above-mentioned film thickness, configuration, and material.

In a configuration of the crystal texture control and segregation promotion underlayer 44, the role of the NiTa layer is for controlling the crystal orientation of the NiW layer and for improving the (111) orientation of the NiW layer. The film thickness of the NiTa layer should be controlled in a range where it is satisfied and a value of about from 1 nm to 5 nm is normally used. An amorphous material such as an AlTi alloy, a CrTi alloy, and a CrTa alloy and a microcrystalline material such as Ta may be used instead of a NiTa alloy. The roles of the NiW layer in the crystal texture control and segregation promotion underlayer 44 is for improving the c-axis orientation along the perpendicular direction of the Ru film surface and for controlling the grain size and roughness thereof. The film thickness of the NiW layer should be controlled in a range where it is satisfied and a value of about from 2 nm to 12 nm is regularly used. Pd, Pt, Cu, and Ni which have a face-centered-cubic lattice (fcc) structure and an alloy including them may be used instead of a NiW alloy. Specifically, it is preferable to promote the segregation of the recording layer if an alloy is used which includes Ni as a main component and includes at least W, Cr, V, or Cu.

The roles of the Ru layer are for controlling the crystal grain size and crystal orientation of the recording layer and for decreasing the exchange coupling between the crystal grains of the recording layer. The film thickness should be controlled in a range where it is satisfied and a value of about from 3 nm to 30 nm is normally used. In this embodiment, the Ru layer of the crystal texture control and segregation promotion underlayer 44 is formed separated into two layers and the lower half was formed under the conditions of a gas pressure of 1 Pa and 4 nm/s and the upper half under the conditions of a gas pressure of 6.5 Pa and 1.5 mm/s.

The magnetic layer 45 comprised a double-layer of the first magnetic layer 451 and the second magnetic layer 452, and the film thicknesses of the first magnetic layer 451 and the second magnetic layer were 10 nm and 3 nm, respectively. A 3.5 nm thick 60 at. % Co-12 at. % Cr-16 at. % Pt-12 at. % B alloy was used for the ferromagnetic-metal layer 46 which does not include an oxide, and Ar was used for a sputter-gas and the total gas pressure was controlled to be 0.6 Pa. Then, a 3.5 nm thick DLC (diamond like carbon) film was formed as a protective layer 47. A lubricant film was formed by coating an organic lubricant over the surface thereof.

Figure 2:
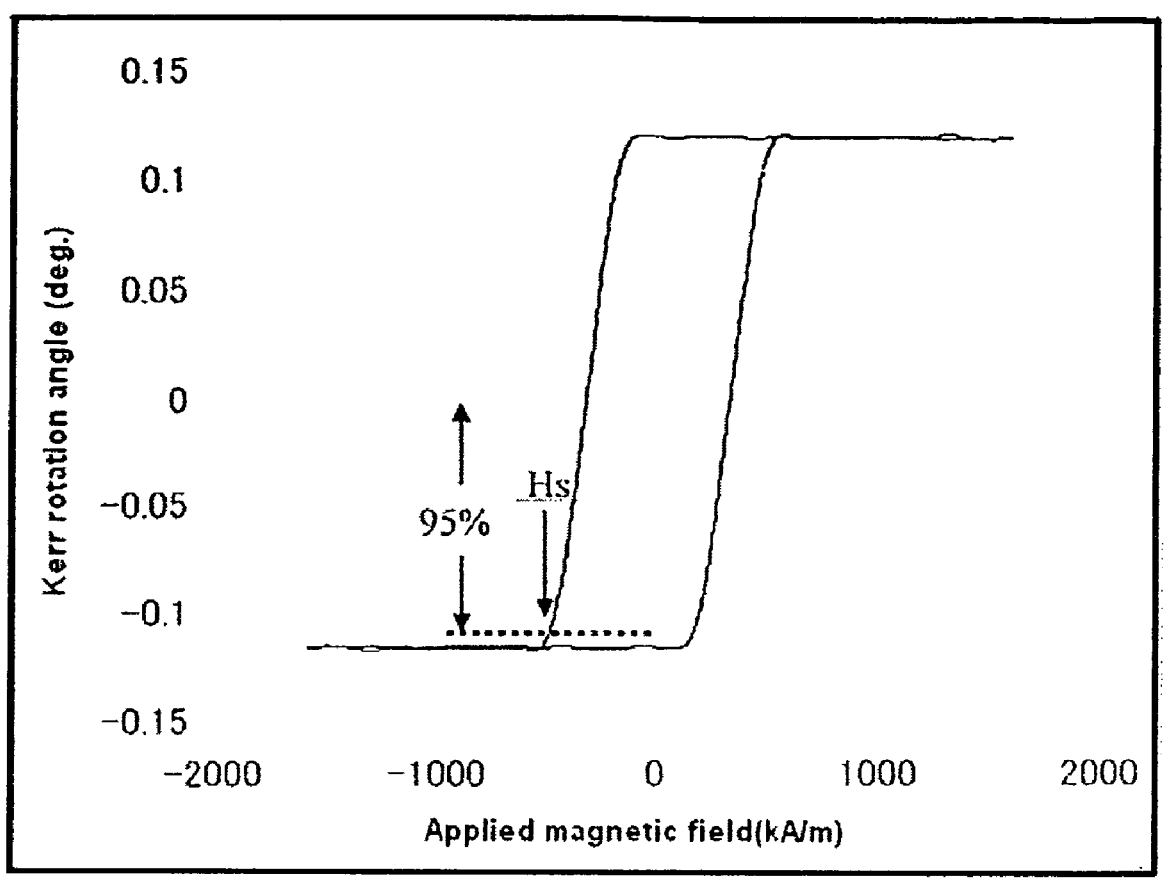
FIG. 2 is a diagram showing a definition of a Kerr loop after correction and a saturation field (Hs) of a double-layer perpendicular magnetic recording medium having a soft-magnetic underlayer.

Evaluation of the magnetic properties was carried out by using Kerr effect measuring equipment at room temperature. The measurement wavelength is 350 nm and the laser spot diameter is about 1 mm. A magnetic field was applied in direction perpendicular to the sample film surface; the maximum magnetic field was controlled to be 1580 kA/m (20 kOe), and the Kerr loop was measured for 60 seconds at a constant sweep rate. Since the laser beam reached the soft-magnetic underlayer when the film thickness of the recording layer is thin, the change of the Kerr rotation angle caused by the magnetization of the soft-magnetic underlayer is added to the signal from the recording layer. The signal caused by the soft-magnetic underlayer changes linearly with the magnetic field until the magnetization becomes saturated in the direction perpendicular to the film surface, so that the inclination at around 395 to 1580 kA/m (5 to 10 kOe) is controlled to be zero. The condition after the correction is shown in FIG. 2. After that, the coercivity (Hc), the saturation field (Hs), and the nucleation field (-Hn) were obtained. Hs was defined as a magnetic field where the Kerr rotating angle becomes 95% of the saturation value when the magnetic field was increased from 0 to 1580 kA/m (20 kOe) as shown in FIG. 2. -Hn is defined as a magnetic field where the Kerr rotating angle becomes 95% of the saturation value when the magnetic field was decreased from the positively saturated state, and it was defined as positive when it is in the second quadrant.

In the evaluation of the recording performance, the reproducing output signal and noise were measured under the conditions of a relative velocity between head and medium of 10 m/sec, a skew angle of 0 degrees, and a magnetic spacing of about 8 nm, and the medium S/N was defined to be the ratio of the reproducing output signal under a linear recording density of 27126 fr/mm and the integrated noise when a signal was recorded under the aforementioned linear recording density. The OW performances were evaluated by using the ratio of the residual element of the signal of a recording density of 27126 fr/mm and a signal strength of 2713 fr/mm after a signal of 2713 fr/mm was overwritten on a signal of 27126 fr/mm. A giant magnetoresistive element with a shield gap length of 60 nm and a track width of 70 nm was used for the reading part of the magnetic head. The recording part of the magnetic head has a structure of a single pole type head which has a main pole, an auxiliary pole, and thin film conductor coil; and the main pole includes a yolk part and a pole tip of the main pole and a shield is formed to cover the cross-track direction and the down-track direction of the main pole (wraparound-shielded head). A head is used where the geometrical track width of the tip part of main pole is 90 nm, the distance between the main pole and trailing shield is 50 nm, and the distance between the main pole and side shield is 100 nm.

As a read element of the magnetic head mounted in the hard disk drive, a tunneling magnetoresistive element (TMR) and a current perpendicular to plane-GMR (CPP-GMR) where a current flows in a direction perpendicular to the element film face can also be used in addition to a giant magnetoresistive element. Moreover, a shielded head and single-pole-type head which do not have a shield in the cross-track direction may be used as a recording head. However, a shielded head where a shield is provided at least in the down-track direction of the main pole is preferable from the point that the write-field gradient can be improved.

When the composition analysis of the magnetic layer in the film thickness direction is performed, X-ray photoelectron spectroscopy (XPS) is used and an area with a length of 1.5 mm and a width of 0.1 mm was analyzed by etching into the depth direction by sputtering from the sample surface using an ion gun with an accelerating voltage of 500 V and by using the K$\alpha$ line of aluminum as an X-ray source. The content of each element was obtained by detecting the energy spectrum corresponding to each of the 1s electrons of C, the 1s electrons of O, the 2s electrons of Si, the 2p electrons of Cr, the 2p electrons of Co, the 3d electrons of Ru, and the 4f electrons of Pt. For instance, when the amount of the Cr oxide was obtained, the ratio of metallic Cr and Cr oxide was obtained from the chemical shift of the Cr spectrum.

The first magnetic layer 451 and the second magnetic layer 452 were formed by using a target which includes 61 at. % Co-21 at. % Cr-18 at. % Pt and $SiO_2$ with a ratio of 94 mol:6 mol under the conditions of gas pressure of 5 Pa, a deposition rate of 3 nm/s, and a substrate bias of −275 V. A sample was manufactured where argon was only used as the sputter-gas for forming the second magnetic layer 452 and the oxygen concentration of the sputter-gas during formation of the first magnetic layer was changed from 2 to 4%. When the average oxide concentration in a region of around 2 nm of the upper layer of the second magnetic layer 452 was investigated, the element concentrations included in all the oxides was 10.4 at. % and the element concentration included in the Cr oxide was 0.3 at. %.

Figure 3:
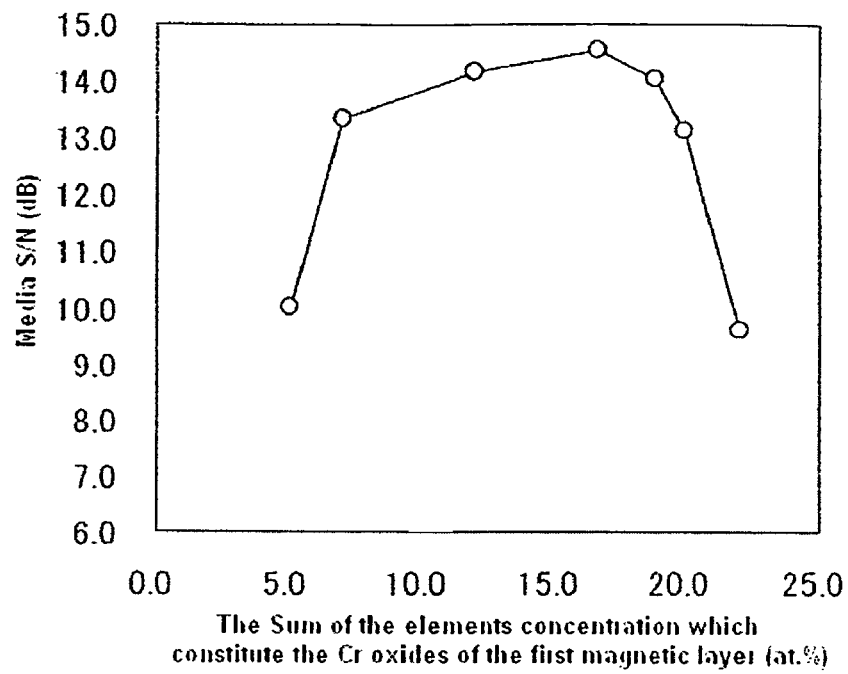
FIG. 3 is a diagram showing a relationship between the concentration of elements included in Cr oxide of a first magnetic layer and the medium S/N.
Figure 4:
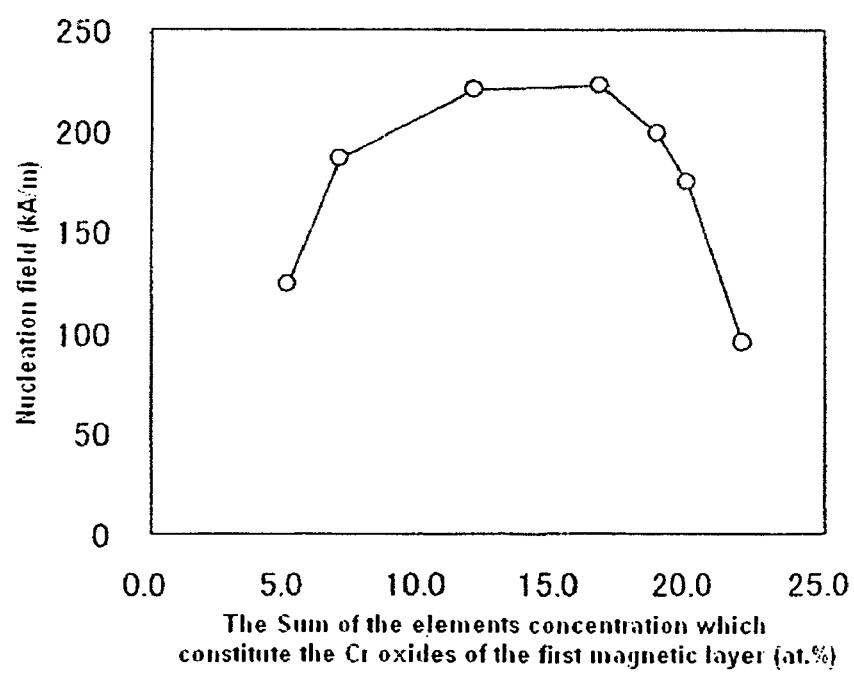
FIG. 4 is a diagram showing a relationship between the concentration of elements included in Cr oxide of a first magnetic layer and the nucleation field.

The sum of concentrations of Cr element and oxygen element included in the Cr oxide was obtained in the region of about 4 nm of the lower layer side of the first magnetic layer 451 in a sample where the oxygen concentration during formation of the first magnetic layer 451 was controlled to be from 2 to 4%. FIG. 3 and FIG. 4 are diagrams which show the dependences of medium S/N and nucleation field (-Hn) on the sum of concentrations of Cr element and oxygen element included in the Cr oxide.

The medium S/N is drastically deteriorated when the sum of concentrations of Cr element and oxygen element becomes less than 7 at. %. It is understood that this is due to formation of grain boundaries being insufficient by decrease in the Cr oxide, and the exchange coupling working between crystal grains of the first magnetic layer 451 becomes rapidly stronger. Since the nucleation field (-Hn) is small, Cr does not segregate but remains in the crystal grains, so that it is understood that the magnetic anisotropy is decreased and the thermal stability is deteriorated.

Figure 5:
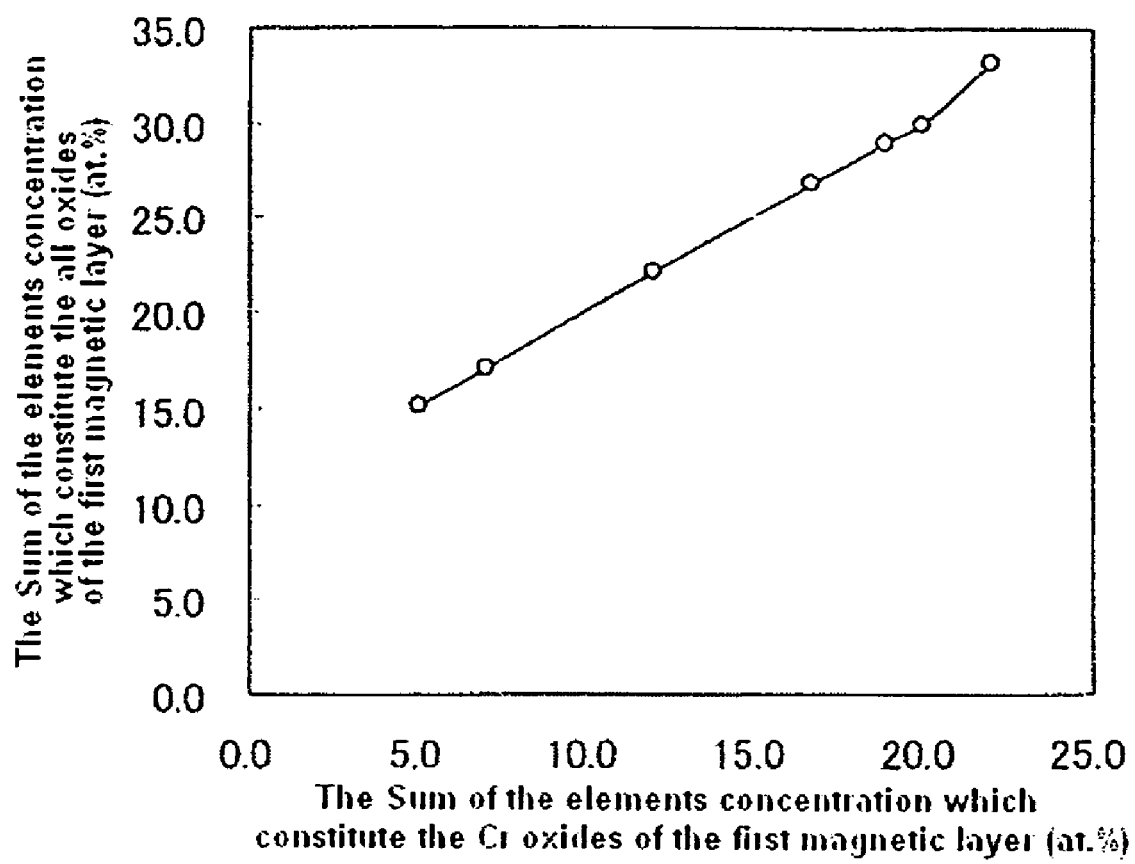
FIG. 5 is a diagram showing a relationship between the element concentration of elements included in Cr oxide and the concentration of elements included in all oxides in the first magnetic layer.

On the other hand, when the concentration of the Cr oxide becomes greater than 20 at. %, the medium S/N and the nucleation field are also drastically decreased. A sample was formed where the first magnetic layer 451 was formed and then the protective layer 47 was formed without forming the second magnetic layer 452, and the ferromagnetic-metal layer 46, and the first magnetic layer 451 was observed by using a transmission electron microscope. Although the average crystal grain was reduced, the distribution of the grain size was large and many subgrains where grain boundaries with small width exist inside of the crystal grains were observed, so that it is thought that an increase in the grain size distribution causes deterioration of the medium S/N. Moreover, when the concentration of the Cr oxide is as great as 20 at. %, the sum of the concentrations of all elements included in the oxide of the first magnetic layer is as great as about 34 at. %, so that it is thought that a decrease in the packing density of the magnetic grains causes deterioration of the medium S/N. According to the composition analysis, it is ensured that a lot of Co oxide exists, so that it is thought that the thermal stability is deteriorated by decreasing the magnetic anisotropy and refining the grain size. It is understood that the concentration of the elements included in the Cr oxide of the first magnetic layer is preferably 7 at. % or more and 20 at. % or less. At this time, the sum of the concentrations of all elements included in the oxide was from 15 to 30 at. % as shown in FIG. 5.

Next, samples shown in Table I were manufactured where the kind and concentration of the oxide in the target used for forming the magnetic layer 45 are changed. The film thickness of the first magnetic layer 451 is 10 nm and the film thickness of the second magnetic layer 452 is 3 nm.

least an oxide having a high free energy of oxide formation such as Si, Ti, Ta, and Nb is important in addition to having a high concentration of elements included in the Cr oxide.

Figure 6:
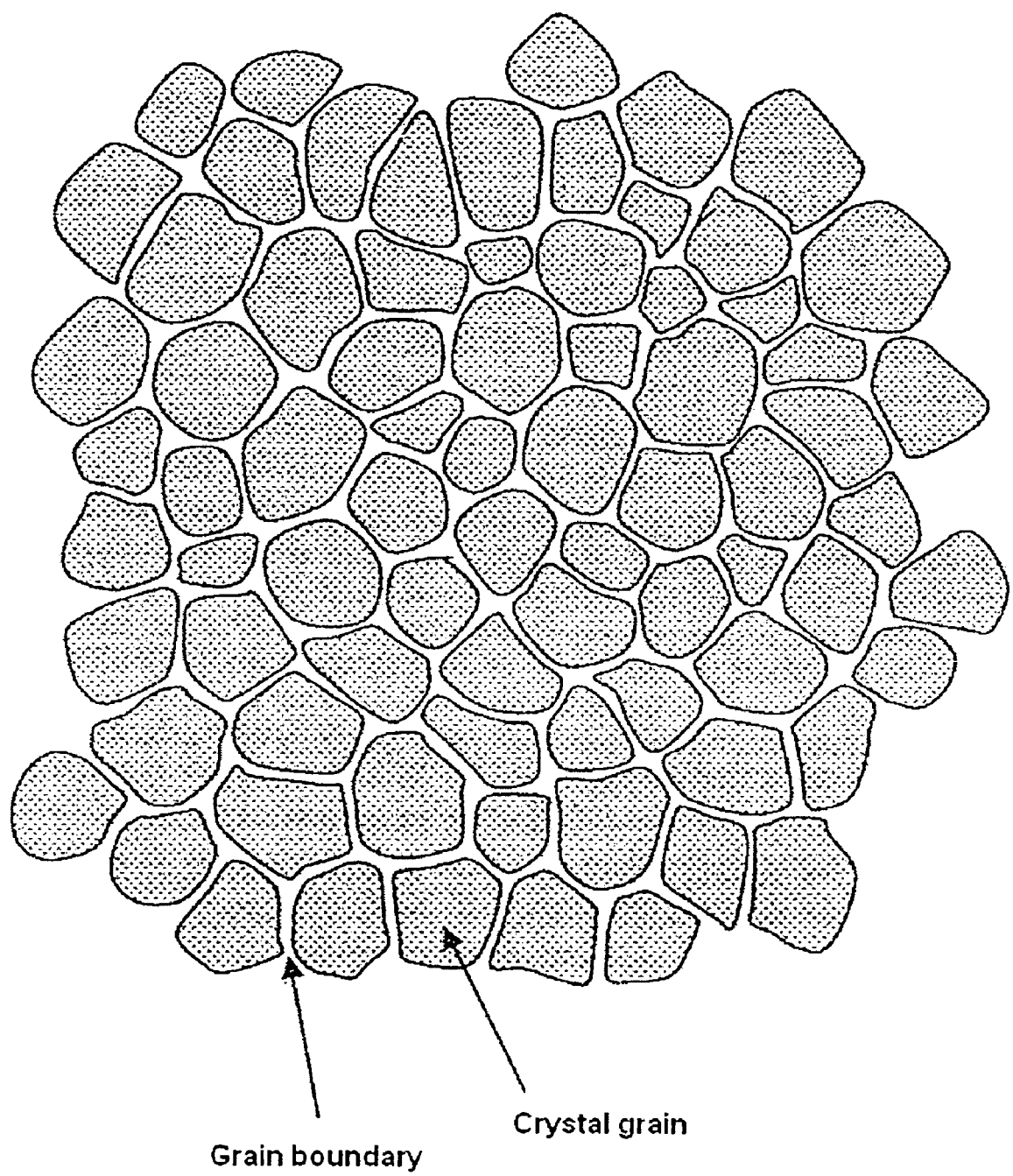
FIG. 6 is a schematic drawing illustrating a transmission electron microscope observation image of a plane structure of a first magnetic layer according to embodiments of the present invention which includes an oxide having a high free energy of oxide formation such as Si and includes a lot of Cr oxide.

When a sample where the second magnetic layer 452 and the ferromagnetic-metal layer 46 were not formed was manufactured and the structure of the first magnetic layer 451 was observed by using a transmission electron microscope (TEM), wide and uniform grain boundaries as shown in FIG. 6 were observed in the samples 1-1 to 1-7 which include a lot

TABLE 1

| | First magnetic layer | | | | Second magnetic layer | | | |
|---|---|---|---|---|---|---|---|---|
| | Target composition | Gas Pressure | Oxygen | Bias | Target composition | Gas Pressure | Oxygen | Bias |
| Sample 1-1 | 95[59 at. % Co—23 at. % Cr—18 at. % Pt]—5SiO$_2$ | 5 Pa | 3.5% | −275 V | 95[59 at. % Co—23 at. % Cr—18 at. % Pt]—5SiO$_2$ | 3 Pa | 0.0% | −275 V |
| Sample 1-2 | 96[57 at. % Co—25 at. % Cr—18 at. % Pt]—4SiO$_2$ | 5 Pa | 3.8% | −300 V | 96[57 at. % Co—25 at. % Cr—18 at. % Pt]—4SiO$_2$ | 3 Pa | 0.0% | −300 V |
| Sample 1-3 | 93[63 at. % Co—19 at. % Cr—18 at. % Pt]—7SiO$_2$ | 5 Pa | 2.5% | −200 V | 93[63 at. % Co—19 at. % Cr—18 at. % Pt]—7SiO$_2$ | 3 Pa | 0.0% | −200 V |
| Sample 1-4 | 92[65 at. % Co—17 at. % Cr—18 at. % Pt]—8SiO$_2$ | 5 Pa | 2.2% | −200 V | 92[65 at. % Co—17 at. % Cr—18 at. % Pt]—8SiO$_2$ | 3 Pa | 0.0% | −200 V |
| Sample 1-5 | 98.5[61 at. % Co—21 at. % Cr—18 at. % Pt]—1.5Ta$_2$O$_5$ | 5 Pa | 2.2% | 0 V | 98.5[61 at. % Co—21 at. % Cr—18 at. % Pt]—1.5Ta$_2$O$_5$ | 3 Pa | 0.0% | 0 |
| Sample 1-6 | 98.5[61 at. % Co—21 at. % Cr—18 at. % Pt]—1.5Nb$_2$O$_5$ | 5 Pa | 2.2% | 0 V | 98.5[61 at. % Co—21 at. % Cr—18 at. % Pt]—1.5Nb$_2$O$_5$ | 3 Pa | 0.0% | 0 |
| Sample 1-7 | 94[61 at. % Co—21 at. % Cr—18 at. % Pt]—6TiO$_2$ | 5 Pa | 3.0% | −250 V | 94[61 at. % Co—21 at. % Cr—18 at. % Pt]—6TiO$_2$ | 5 Pa | 0.0% | −250 V |
| Sample 1-8 | 86[73 at. % Co—9 at. % Cr—18 at. % Pt]—14SiO$_2$ | 5 Pa | 0.8% | −200 V | 94[61 at. % Co—21 at. % Cr—18 at. % Pt]—6SiO$_2$ | 5 Pa | 0.0% | −275 V |
| Sample 1-9 | 88[73 at. % Co—10 at. % Cr—18 at. % Pt]—12SiO$_2$ | 5 Pa | 1.2% | −200 V | 94[61 at. % Co—21 at. % Cr—18 at. % Pt]—6SiO$_2$ | 5 Pa | 0.0% | −275 V |
| Sample 1-10 | 90[73 at. % Co—12 at. % Cr—18 at. % Pt]—10SiO$_2$ | 5 Pa | 1.5% | −200 V | 94[61 at. % Co—21 at. % Cr—18 at. % Pt]—6SiO$_2$ | 5 Pa | 0.0% | −275 V |
| Sample 1-11 | 69 at. % Co—23 at. % Cr—18 at. % Pt | 5 Pa | 3.5% | −200 V | 94[61 at. % Co—21 at. % Cr—18 at. % Pt]—6 SiO$_2$ | 5 Pa | 0.0% | −275 V |

| | First magnetic Layer Cr oxide amount (at. %) | First magnetic Layer Total oxide amount (at. %) | Second magnetic layer Cr oxide amount (at. %) | Second magnetic layer Total oxide amount (at. %) | S/N (dB) |
|---|---|---|---|---|---|
| Sample 1-1 | 19.0 | 27.4 | 0.2 | 8.6 | 15.0 |
| Sample 1-2 | 20.0 | 26.8 | 0.2 | 5.3 | 15.4 |
| Sample 1-3 | 11.0 | 22.3 | 0.3 | 11.6 | 13.3 |
| Sample 1-4 | 7.0 | 19.6 | 0.4 | 13.0 | 12.8 |
| Sample 1-5 | 13.9 | 21.4 | 0.2 | 7.7 | 13.9 |
| Sample 1-6 | 14.1 | 21.5 | 0.2 | 7.8 | 13.9 |
| Sample 1-7 | 14.7 | 24.4 | 0.3 | 10.4 | 14.2 |
| Sample 1-8 | 1.3 | 23.4 | 0.3 | 9.3 | 9.6 |
| Sample 1-9 | 1.8 | 20.7 | 0.3 | 9.3 | 9.9 |
| Sample 1-10 | 2.5 | 18.3 | 0.3 | 9.3 | 10.3 |
| Sample 1-11 | 19.5 | 19.5 | 0.3 | 9.3 | 11.6 |

The samples 1-8 to 1-10 contain about 20 at. % of the total amount of oxides, which can compose the grain boundaries of the first magnetic layer 451, almost the same amounts as the samples 1-1 to 1-7. Here, it is understood that a high medium S/N can be obtained in one containing a larger amount of Cr oxide even if the total amount of oxide is the same by comparing the samples 1-1 to 1-7 where the concentration of elements included in Cr oxide is in the range of 7 at. % or more and 20 at. % or less, with the samples 1-8 to 1-10 where the concentration of elements included in Cr oxide is less than 7 at. %. It is understood that increasing the concentration of elements included in the Cr oxide is effective to improve S/N rather than increasing the concentration of oxide such as Si which has a high free energy of oxide formation.

Figure 7:
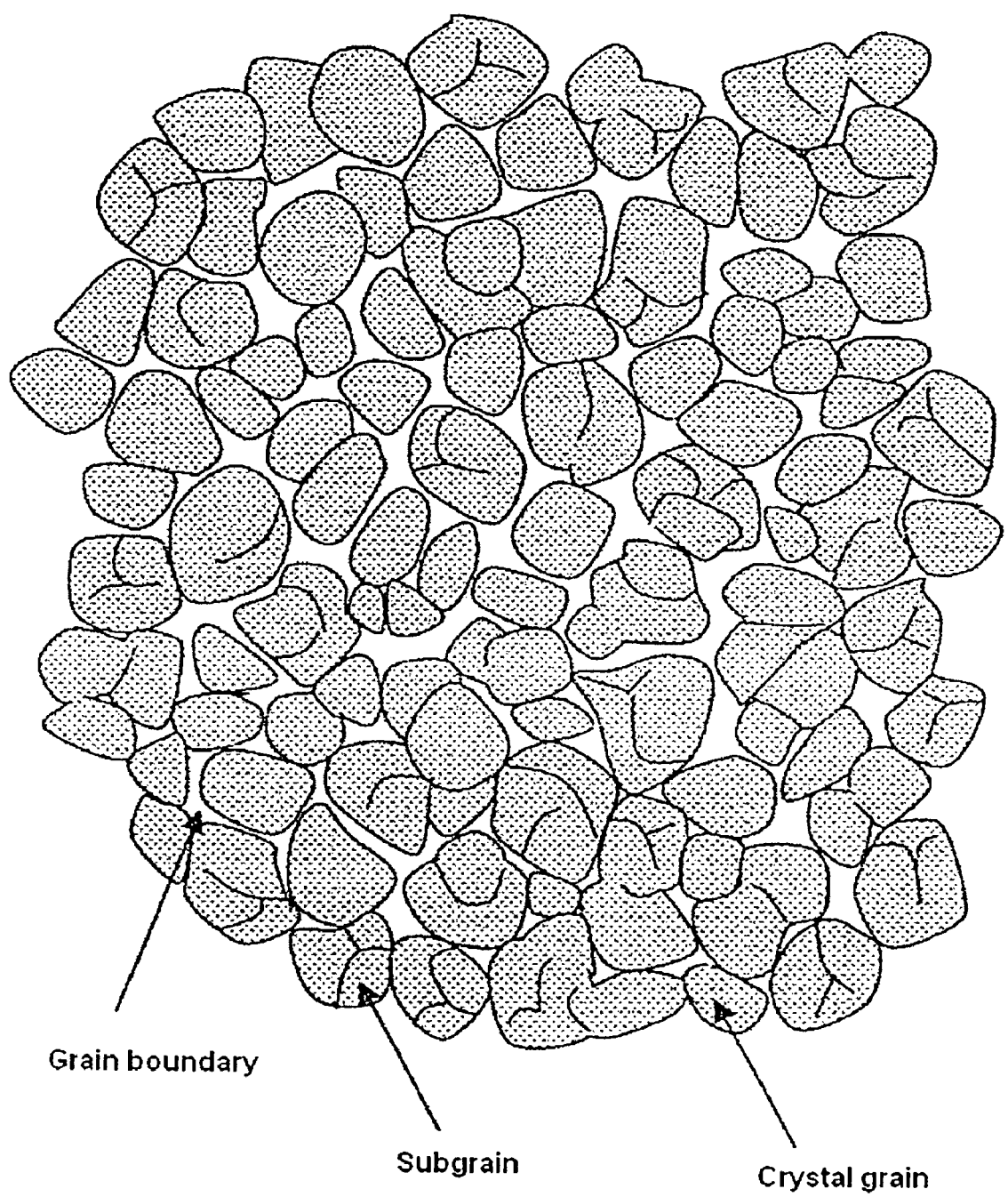
FIG. 7 is a schematic drawing illustrating a transmission electron microscope observation image of a plane structure of a first magnetic layer of the comparative example which includes a lot of oxide having a high free energy of oxide formation such as Si and includes a small amount of Cr oxide.

Moreover, from the comparison between the samples 1-1 to 1-7 and the samples 1-11, it is understood that including at of Cr oxide and an oxide with a high free energy of oxide formation such as Si, etc. On the other hand, in the samples 1-8 to 1-10 where a lot of Si oxide having a high free energy of oxide formation and a small amount of Cr oxide, although the average crystal grains were small as shown in FIG. 7, the width of the grain boundaries is not uniform, many subgrains exist, and an increase in the grain size distribution was observed. In the samples 1-8 to 1-10 even looking at the reduction of the grain size, since the exchange coupling between the subgrains is strong and the magnetic cluster size is not decreased in a practical way, the result is the S/N ratio not being improved. Moreover, an increase in switching field distribution with an increase in the distribution of the grain size and the distribution of the crystallographic orientation is considered to be a cause of the deterioration of medium S/N.

When the compositions of grain boundary parts of the samples 1-1 to 1-7 were analyzed by using TEM-EELS where a transmission electron microscope (TEM) is combined with an electron energy-loss spectroscopy (EELS), it was confirmed that a lot of Si, Cr, and O (oxygen) exist. On the other hand, in the samples 1-8 to 1-10, a lot of Si and O (oxygen) were observed at grain boundaries and the amount of Cr was small. Moreover, in the sample 1-11, although there are wide grain boundaries, the width is not uniform, the state where the crystal grains are stacked together was observed in large numbers, and the crystal grain size was overgrown compared with the samples 1-1 to 1-7 which include Si oxide, Ta oxide, Nb oxide, and Ti oxide. It is considered the cause which makes the S/N deteriorate. It is understood that Cr oxide is segregated and wide and uniform grain boundaries can be formed by making a trigger of a grain boundary using an oxide which has a high free energy of oxide formation such as Si, Ti, Ta, and Nb, etc.

Accordingly, as an oxide contained in the first magnetic layer 451, an oxide having a high free energy of oxide formation such as Si, Ti, Ta, and Nb, etc. is included and the concentration of elements contained in the Cr oxide is controlled to be 7 at. % or more and 20 at. % or less, thereby, it is understood that uniform and wide grain boundaries can be formed, the exchange coupling is uniformly decreased, and the S/N can be greatly improved.

Next, a sample was manufactured where the concentration of the Cr oxide included in the second magnetic layer 452 was changed. The first magnetic layer 451 and the second magnetic layer 452 were formed by using a target which includes 61 at. % Co-21 at. % Cr-18 at. % Pt and $SiO_7$ with a ratio of 94 mol:6 mol under the conditions where the atmosphere was a mixed gas of argon and oxygen, a deposition rate of 3 nm/s, and a substrate bias of −275 V. The sputter-gas pressure was controlled to be 5.5 Pa, the oxygen concentration in the sputter-gas was 3% during formation of the first magnetic layer 451, and the oxygen concentration in the sputter-gas was changed from 0 to 4% during formation of the second magnetic layer 452.

When the average oxygen concentration was investigated in a region of 4 nm of the lower layer of the first second magnetic layer 451, the element concentration included in all the oxides was 25.1 at. % and the element concentration included in the Cr oxide was 15 at. %.

Figure 8:
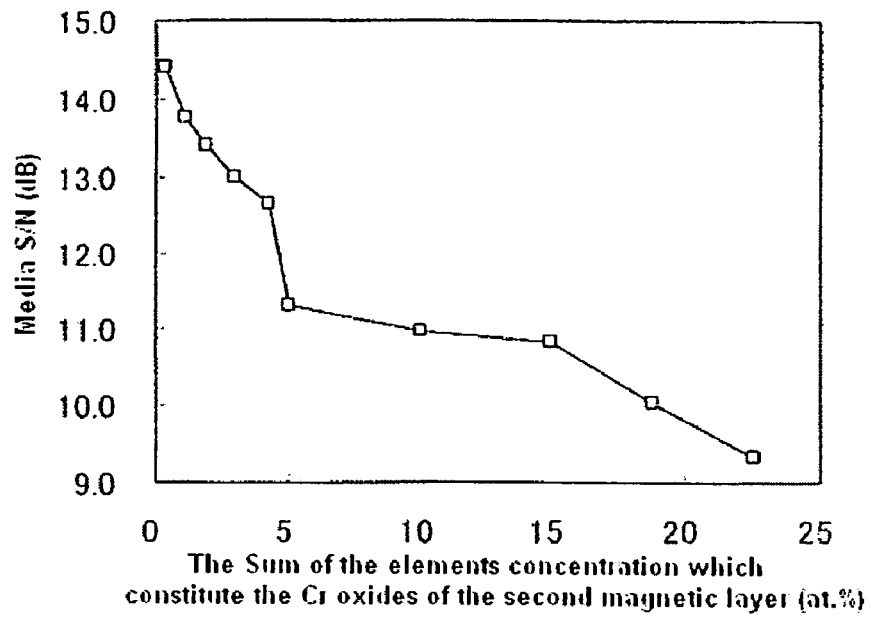
FIG. 8 is a diagram showing a dependence of medium S/N on the concentration of elements included in Cr oxide of the second magnetic layer.
Figure 9:
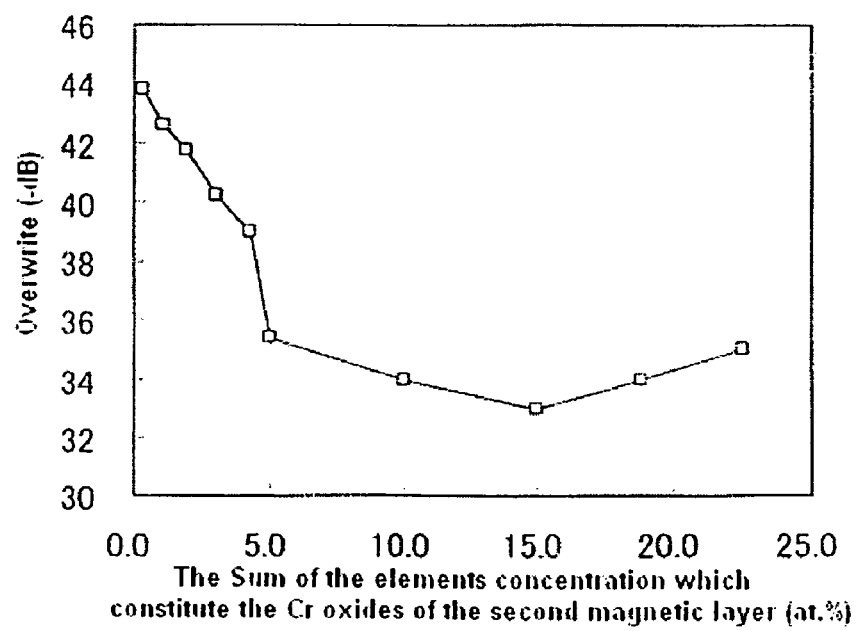
FIG. 9 a diagram showing a dependence of overwrite performance on the concentration of elements included in Cr oxide of the second magnetic layer.
Figure 10:
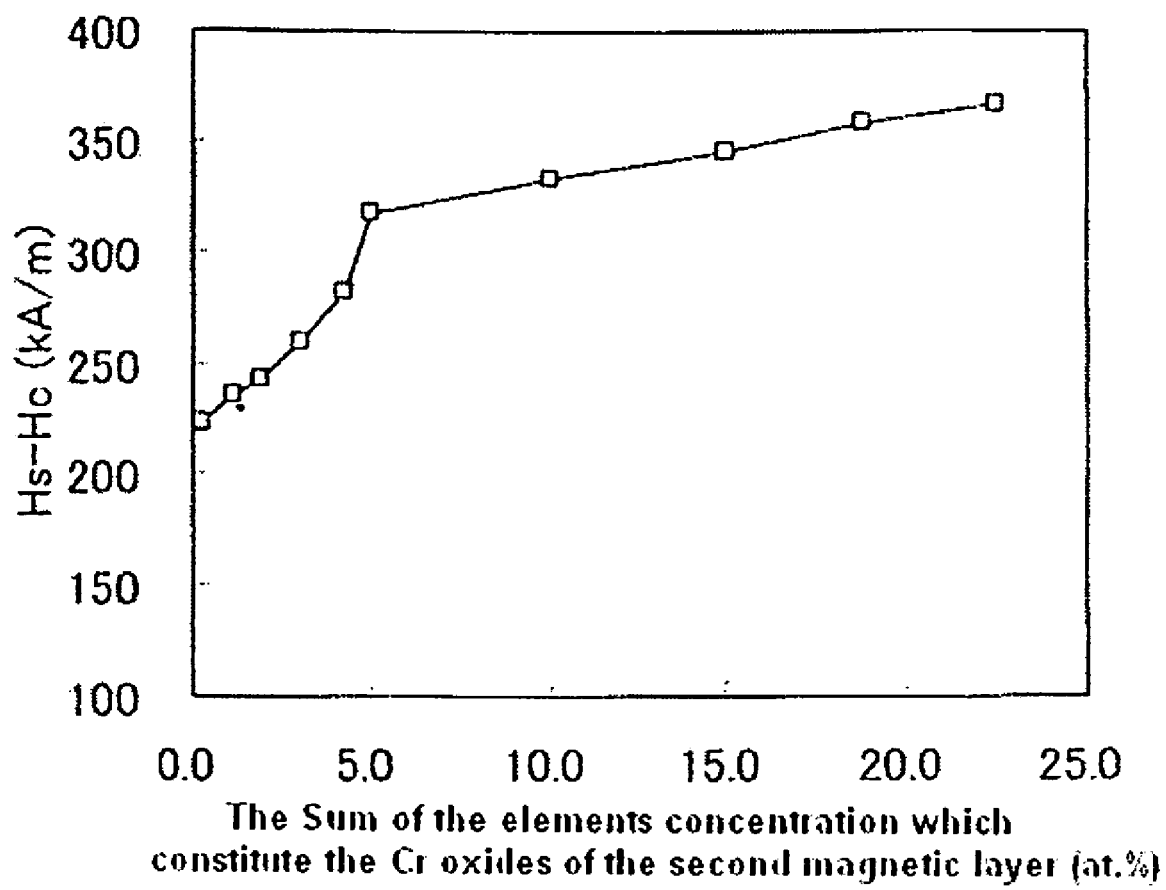
FIG. 10 is a diagram showing a dependence of the switching field distribution (Hs-Hc) on the concentration of elements included in Cr oxide of the second magnetic layer.
Figure 11:
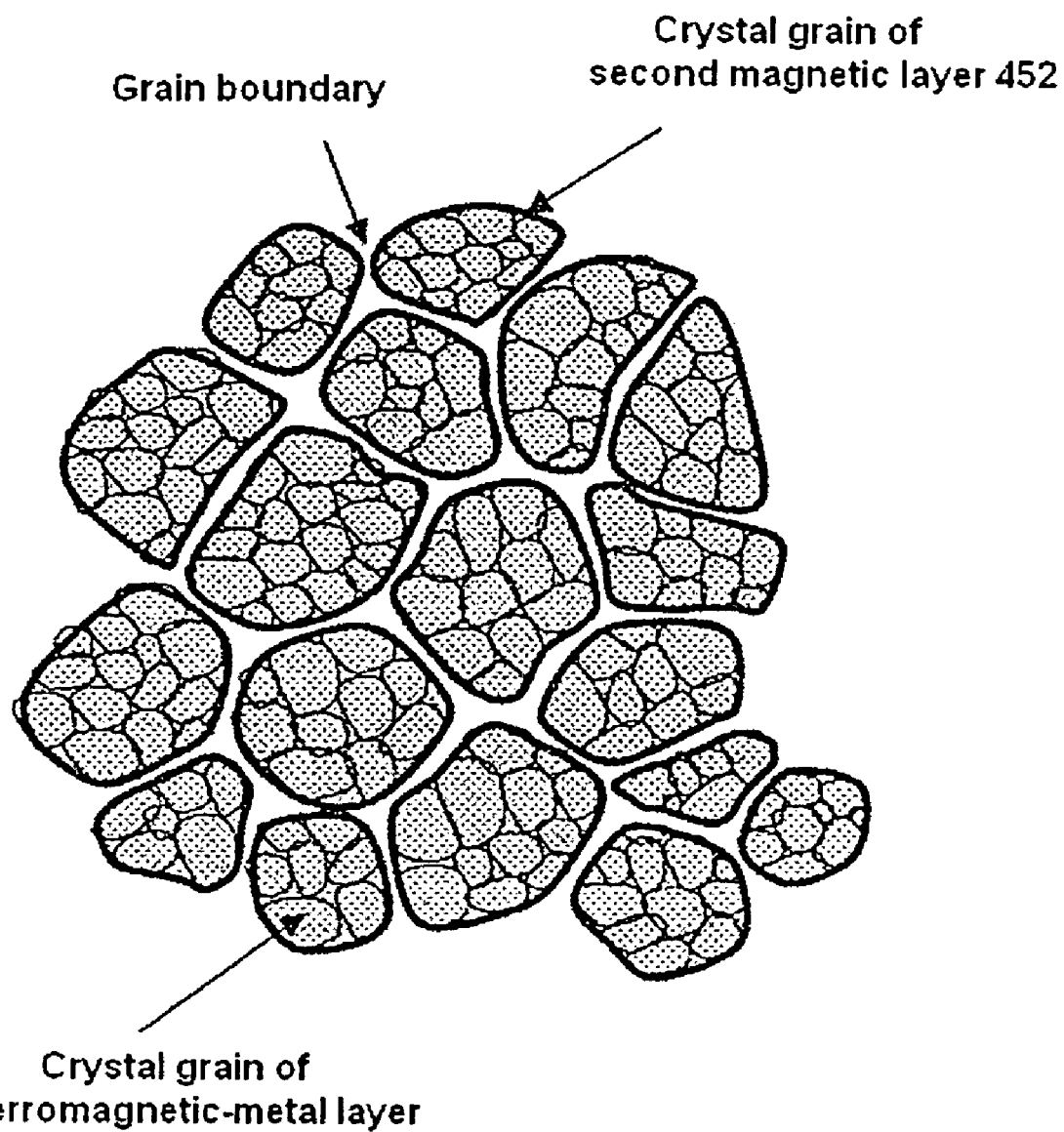
FIG. 11 is a schematic drawing illustrating a transmission electron microscope observation image of a plane structure of a second magnetic layer and a ferromagnetic-metal layer of a comparative example where the concentration of elements included in Cr oxide of the second magnetic layer is high.

The concentration of Cr oxide was obtained in a region of about 2 nm of the upper layer side of the second magnetic layer 452 in a sample where the oxygen concentration during formation of the second magnetic layer 452 was controlled to be from 0 to 4%. Medium S/N, OW performances, and switching field distribution (Hs-Hc) of these samples are plotted against the concentration of elements included in the Cr oxide of the second magnetic layer 452, and the results are shown in FIG. 8 to FIG. 10.

S/N deteriorates drastically when the concentration of the elements in the Cr oxide included in the second magnetic layer 452 increases exceeding the concentration of the elements included in the Cr oxide of the first magnetic layer 451. This is due to the increase of noise with increasing switching field distribution and the decrease of resolution by initiation of Co oxidation. It is necessary that the concentration of elements included in the Cr oxide of the second magnetic layer 452 be lower than the first magnetic layer 451. The concentration of elements included in the Cr oxide in the second magnetic layer 452 is made smaller then that of the first magnetic layer 451, resulting in the medium S/N being improved by a slowly decreasing switching field distribution. When the concentration of elements in the Cr oxide included in the second magnetic layer 452 becomes less than 5%, switching field distribution and the OW performances are greatly improved, resulting in the medium S/N being drastically improved.

Figure 12:
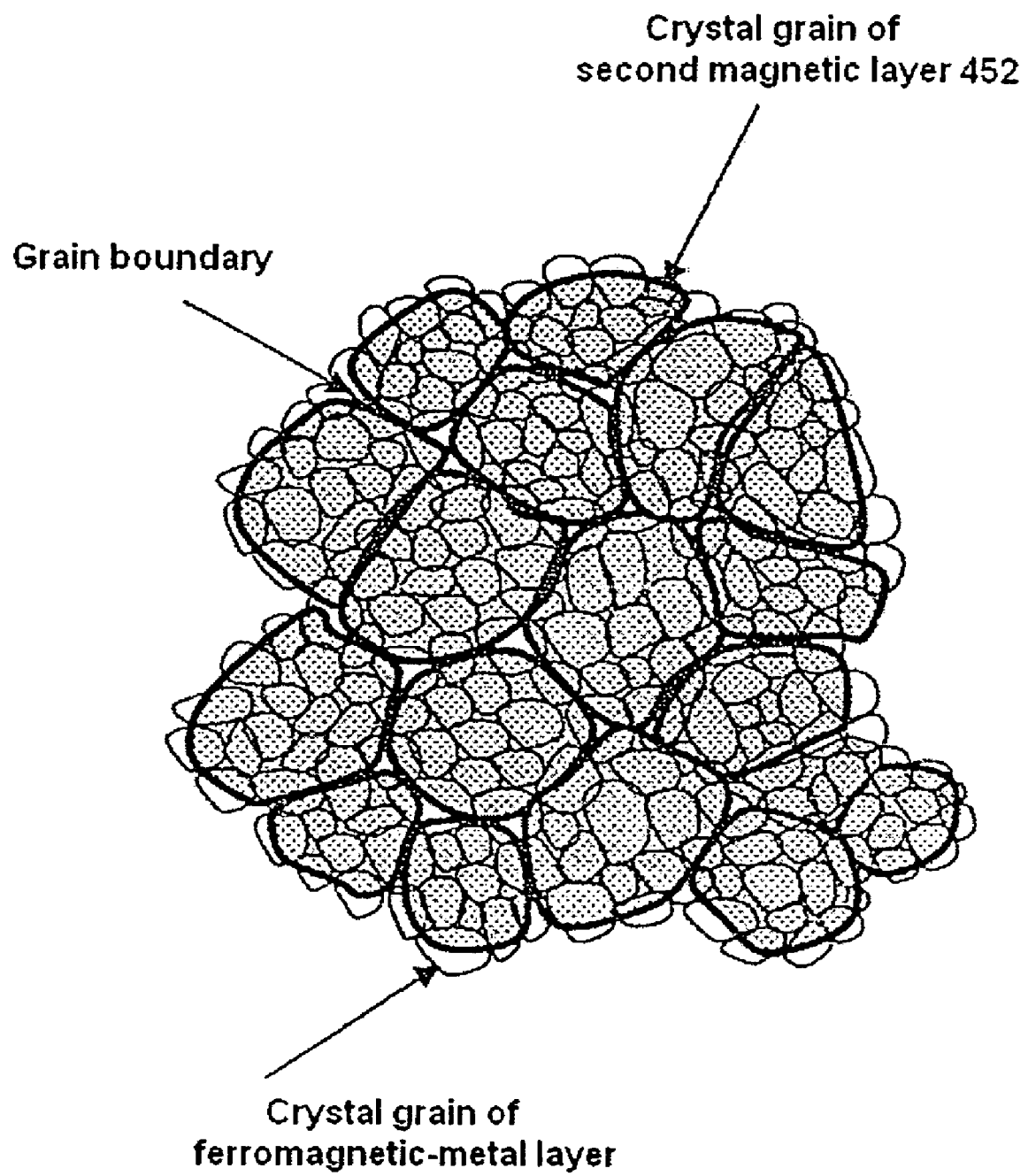
FIG. 12 is a schematic drawing illustrating a transmission electron microscope observation image of a plane structure of a second magnetic layer and a ferromagnetic-metal layer according to embodiments of the present invention where the concentration of elements included in Cr oxide of the second magnetic layer is low.

The sample with an element concentration in the neighborhood of 5% in the Cr oxide included in the second magnetic layer 452 where the medium S/N has drastically changed is processed from the substrate side to be as thin as the thickness which only includes almost the second magnetic layer 452 and the ferromagnetic-metal layer 46, and the planar structure was observed by a transmission electron microscope. When the concentration of elements included in the Cr oxide in the second magnetic layer 452 is less than 5%, the ferromagnetic-metal layer 46 is continuously grown over grain boundaries of the second magnetic layer 452 and grain boundaries with a large width are not observed as shown in FIG. 12. On the other hand, when the concentration of elements included in the Cr oxide in the second magnetic layer 452 is more than 5%, grain boundaries are formed in the ferromagnetic-metal layer reflecting the grain boundaries of the magnetic layer and grain boundaries with a large width are observed. It is understood that the more Cr oxide is included in the second magnetic layer 452, the greater is the probability that separation of crystal grains in the ferromagnetic-metal layer 46 occurs.

Herein, growing continuously over grain boundaries means that the case where grain boundaries of the second magnetic layer 452 do not coincide with grain boundaries of the ferromagnetic-metal layer 46 is dominant. It is considered that uniform exchange coupling is introduced between grains of the magnetic layer 45 by growing crystal grains of the ferromagnetic-metal layer 46 over grain boundaries of the second magnetic layer 452, resulting in the intensity and distribution of the switching field of the magnetic layer 45 being decreased. On the other hand, when a lot of Cr oxide exists in the second magnetic layer 452 and the grain boundaries are wider, crystal grains of the ferromagnetic-metal layer 46 are difficult to grow over grain boundaries mainly composed of an oxide in the second magnetic layer 452, so that crystal grains are grown separated from each other in the early stages of growth and the exchange coupling between crystal grains of the ferromagnetic-metal layer 46 becomes non-uniform reflecting the grain boundary structure. As a result, it is considered that uniform exchange coupling cannot be introduced between grains of the magnetic layer 45 and switching field distribution is increased. It is understood that less Cr oxide, which widens grain boundaries of the second magnetic layer 452, is preferable in order to introduce uniform exchange coupling into the magnetic layer 45 and to decrease switching field distribution. Particularly, when the sum of elements included in the Cr oxide is controlled to be less than 5 at. %, it is understood that improvements of the OW performances and S/N are remarkable. As a result of TEM observations of the cross-section of the aforementioned sample, it is understood that the grain boundary width of the second magnetic layer 452 becomes narrower compared with that of the first magnetic layer 451 by controlling the concentration of Cr oxide included in the second magnetic layer 452 to be lower than that of the first magnetic layer 451 and less than 5%.

Figure 13:
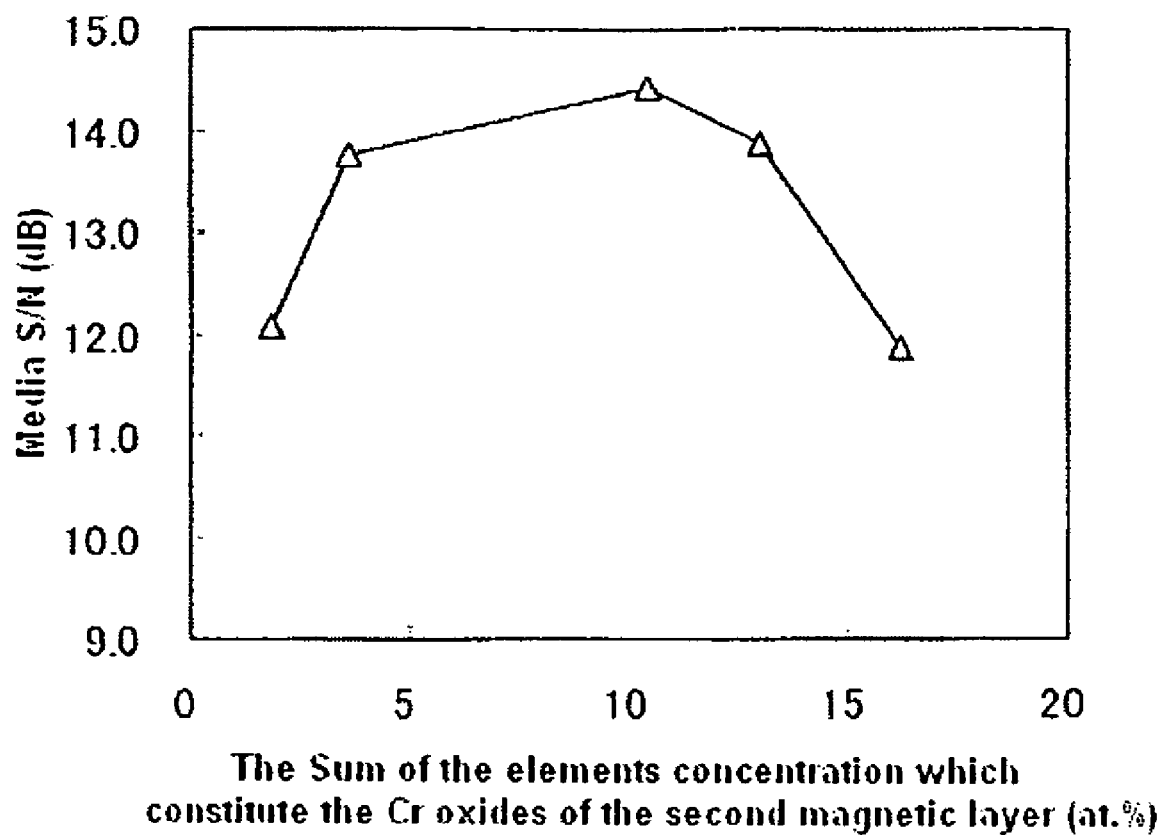
FIG. 13 is a diagram showing a dependence of medium S/N on the concentration of elements included in all oxides of a second magnetic layer.

Next, the first magnetic layer 451 was formed by using the same target which was used for the samples shown in FIG. 8 to FIG. 10, and the second magnetic layer 452 was prepared by using a target in which the ratio of 61 at. %-21 at. % Cr-18 at % Pt and $SiO_2$ was changed from 99 mol:1 mol to 90 mol:10 mol. Herein, when the second magnetic layer 452 was formed, oxygen was not introduced thereto and only Ar was used. The concentration of elements in the Cr oxide included in the second magnetic layer was less than 1 at. %. The dependence of the medium S/N of the prepared sample on the total amount of the elements in the oxide contained in the second magnetic layer is shown in FIG. 13.

It is understood that S/N is deteriorated when the total amount of the elements contained in the oxide in the second magnetic layer 452 is very small, as small as 1.8 at. %. It is due to the grain boundary width of the first magnetic layer 451 being wide and mainly composed of an oxide, so that when the amount of the oxide included in the second magnetic layer 452 becomes very small, the total amount of oxide becomes insufficient for forming grain boundaries reflecting the grain boundaries of the first magnetic layer 451, the grain boundaries are not reduced uniformly and grain boundaries are coupled at places, and non-uniformity is created in the grain boundary width. As a result, it is considered that an area is created having a strong exchange coupling effect working between crystal grains of the second magnetic layer 452 and the magnetic cluster size is increased, thereby, the noise increases. It is understood that the sum of elements included in the Cr oxide is controlled to be less than 5 at. % and the total amount of oxide to be greater than 1.8 at. % in order to reduce the grain boundary width uniformly.

Moreover, it is understood that the deterioration of medium S/N is observed when the total amount of elements contained in the oxide in the second magnetic layer 452 is as large as 16.3 at. %. This is due to an increase in subgrains with increasing Si oxide having a large free energy of oxide formation when the total amount of elements in the oxide becomes greater beyond 13%, and due to crystal orientation of the ferromagnetic-metal layer grown thereon being deteriorated and dispersion of the intergranular exchange coupling increasing. It is understood that the sum of Cr element and oxygen element included in the Cr oxide is controlled to be less than 4.3 at. % and the total amount of oxide to be less than 13 at. % in order to reduce the grain boundary width uniformly.

Accordingly, the first magnetic layer 451 has a structure where Cr oxide and at least one or more oxides selected from Si, Ti, Nb, and Ta are segregated to grain boundaries thereof, and the second magnetic layer 452 includes at least one or more oxides selected from Si, Ti, Nb, and Ta, and the Cr oxide thereof is controlled to be less than the first magnetic layer 451, thereby, it becomes clear that the distribution of exchange coupling and switching field can be decreased and a high S/N, resolution, and thermal stability can be achieved by reducing the grain boundary width of the second magnetic layer 452 and letting crystal grains of the ferromagnetic-metal layer 46 grown thereon to grow over grain boundaries of the magnetic layer 45 continuously.

Embodiment 2

Figure 14:
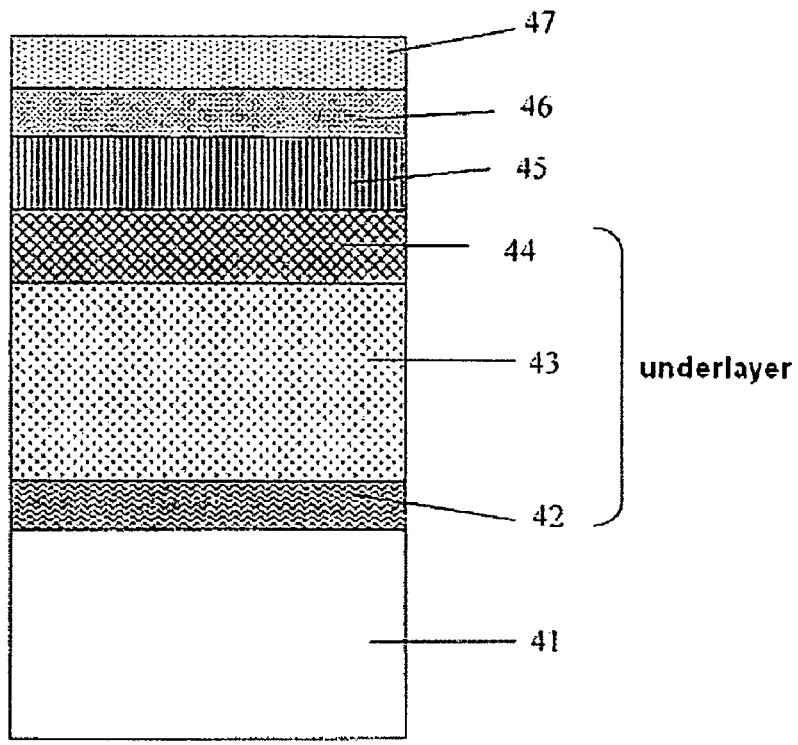
FIG. 14 is a cross-sectional drawing illustrating a structural example of perpendicular magnetic recording media according to embodiments of the present invention.

FIG. 14 is a schematic cross-sectional drawing illustrating a manufactured perpendicular magnetic recording medium. Perpendicular magnetic recording media of this embodiment was manufactured by using the same sputtering apparatus as the aforementioned embodiment 1 and the same layer configuration and same process conditions as the embodiment 1 were taken except for the magnetic layer 45 and the ferromagnetic-metal layer 46. The magnetic layer 45 was formed by using a composite target which includes [61 at. % Co-21 at % Cr-18 at. % Pt] and $SiO_2$ with a ratio of 94 mol:6 mol under the conditions of a deposition rate of 3 nm/s and a substrate bias of −275 V. The film thickness was 13 nm. The sputter-gas condition was changed in a stepwise fashion while forming the magnetic layer 45. A mixed gas of argon and oxygen was used and the total gas pressure and oxygen concentration were controlled to be 5 Pa and 3%, respectively, while forming the lower layer side of the magnetic layer 45. While forming the upper layer of the magnetic layer 45, only Ar was used and the total gas pressure was set to be 2 Pa.

The ferromagnetic-metal layer 46 which does not include oxide was formed of a CoCrPt alloy, a CoCrPtB alloy, and a CoCrPtBMo alloy, and Ar was used as the sputter-gas and the total gas pressure was controlled to be 0.6 Pa. Table 2 shows the film thicknesses of the upper layer and the lower layer of the magnetic layer 45, and the composition and the film thickness of the ferromagnetic-metal layer 46. As a comparison, a medium was manufactured where the sputter-gas condition was not changed during the formation of the magnetic layer 45 and the oxygen concentration in the sputter-gas was controlled to be a constant 3%, and a medium was manufactured where the magnetic layer 45 was formed by using a composite target including [72 at. % Co-10 at. % Cr-18 at. % Pt] and $SiO_2$ with a ratio of 88 mol:12 mol. They are collectively shown in Table 2.

TABLE 2

| | | Lower layer of magnetic layer (interface side with Ru underlayer) | | | Upper layer of magnetic layer (interface side with ferromagnetic-metal layer) | | | Ferromagnetic-metal layer | |
|---|---|---|---|---|---|---|---|---|---|
| | Target composition | For all gas pressure | Oxygen concentration | Film thickness | For all gas pressure | Oxygen concentration | Film thickness | Target composition | Film thickness |
| Embodiment 2-1 | 94[61 at. % Co—21 at. % Cr—18 at. % Pt]—6$SiO_2$ | 5 Pa | 3.0% | 6.5 nm | 3 Pa | 0.0% | 7.5 nm | 63 at. % Co—15 at. % Cr—14 at. % Pt—8 at. % B | 3 nm |
| Embodiment 2-2 | 94[61 at. % Co—21 at. % Cr—18 at. % Pt]—6$SiO_2$ | 5 Pa | 3.0% | 8.5 nm | 3 Pa | 0.0% | 4.5 nm | 63 at. % Co—15 at. % Cr—14 at. % Pt—8 at. % B | 4 nm |
| Embodiment 2-3 | 94[61 at. % Co—21 at. % Cr—18 at. % Pt]—6$SiO_2$ | 5 Pa | 3.0% | 10.5 nm | 3 Pa | 0.0% | 2.5 nm | 63 at. % Co—15 at. % Cr—14 at. % Pt—8 at. % B | 5 nm |
| Embodiment 2-4 | 94[61 at. % Co—21 at. % Cr—18 at. % Pt]—6$SiO_2$ | 5 Pa | 3.0% | 8.5 nm | 3 Pa | 0.0% | 4.5 nm | 63 at. % Co—13 at. % Cr—14 at. % Pt—8 at. % B—2 at. % Mo | 4 nm |

TABLE 2-continued

| | | | | | | | | | |
|---|---|---|---|---|---|---|---|---|---|
| Embodiment 2-5 | 94[61 at. % Co—21 at. % Cr—18 at. % Pt]—6SiO₂ | 5 Pa | 3.0% | 8.5 nm | 3 Pa | 0.0% | 4.5 nm | 66 at. % Co—20 at. % Cr—14 at. % Pt | 3.5 nm |
| Comparative example 2-1 | 94[61 at. % Co—21 at. % Cr—18 at. % Pt]—6SiO₂ | 5 Pa | 3.0% | 13 nm | — | — | — | 63 at. % Co—15 at. % Cr—14 at. % Pt—8 at. % B | 3 nm |
| Comparative example 2-2 | 94[61 at. % Co—21 at. % Cr—18 at. % Pt]—6SiO₂ | 5 Pa | 3.0% | 13 nm | — | — | — | 63 at. % Co—15 at. % Cr—14 at. % Pt—8 at. % B | 4 nm |
| Comparative example 2-3 | 94[61 at. % Co—21 at. % Cr—18 at. % Pt]—6SiO₂ | 5 Pa | 3.0% | 13 nm | — | — | — | 63 at. % Co—15 at. % Cr—14 at. % Pt—8 at. % B | 5 nm |
| Comparative example 2-4 | 94[61 at. % Co—21 at. % Cr—18 at. % Pt]—6SiO₂ | 5 Pa | 3.0% | 13 nm | — | — | — | 63 at. % Co—15 at. % Cr—14 at. % Pt—8 at. % B | 7 nm |
| Comparative example 2-5 | 94[61 at. % Co—21 at. % Cr—18 at. % Pt]—6SiO₂ | 5 Pa | 3.0% | 13 nm | — | — | — | 63 at. % Co—13 at. % Cr—14 at. % Pt—8 at. % B—2 at. % Mo | 7 nm |
| Comparative example 2-6 | 94[61 at. % Co—21 at. % Cr—18 at. % Pt]—6SiO₂ | 5 Pa | 3.0% | 13 nm | — | — | — | 66 at. % Co—20 at. % Cr—14 at. % Pt | 6 nm |
| Comparative example 2-7 | 88[73 at. % Co—10 at. % Cr—18 at. % Pt]—12SiO₂ | 5 Pa | 1.5% | 13 nm | — | — | — | 63 at. % Co—15 at. % Cr—14 at. % Pt—8 at. % B | 9 nm |
| Comparative example 2-8 | 88[73 at. % Co—10 at. % Cr—18 at. % Pt]—12SiO₂ | 5 Pa | 1.5% | 8.5 nm | 3 Pa | 0.0% | 4.5 nm | 63 at. % Co—15 at. % Cr—14 at. % Pt—8 at. % B | 7.5 nm |

| | Lower layer of magnetic layer Cr oxide amount (at. %) | Lower layer of magnetic layer Total oxide amount (at. %) | Upper layer of magnetic layer Cr oxide amount (at. %) | Upper layer of magnetic layer Total oxide amount (at. %) | Hs (kA/m) | Hs − Hc (kA/m) | OW (−dB) | S/N (dB) | Adjacent track erasure |
|---|---|---|---|---|---|---|---|---|---|
| Embodiment 2-1 | 15.0 | 25.1 | 0.5 | 10.2 | 521 | 247 | 45 | 14.1 | 0.2 |
| Embodiment 2-2 | 15.0 | 25.1 | 0.8 | 10.5 | 629 | 231 | 44 | 14.7 | 0.3 |
| Embodiment 2-3 | 15.0 | 25.1 | 3.9 | 13.6 | 637 | 235 | 42 | 14.0 | 0.5 |
| Embodiment 2-4 | 15.0 | 25.1 | 0.8 | 10.5 | 625 | 235 | 45 | 14.5 | 0.35 |
| Embodiment 2-5 | 15.0 | 25.1 | 0.8 | 10.5 | 629 | 223 | 44 | 13.9 | 0.6 |
| Comparative example 2-1 | 15.0 | 25.1 | 14.5 | 24.6 | 820 | 342 | 30 | 10.4 | * |
| Comparative example 2-2 | 15.0 | 25.1 | 14.5 | 24.6 | 756 | 310 | 35 | 11.3 | * |
| Comparative example 2-3 | 15.0 | 25.1 | 14.5 | 24.6 | 716 | 286 | 36 | 11.8 | * |
| Comparative example 2-4 | 15.0 | 25.1 | 14.5 | 24.6 | 621 | 239 | 45 | 14.1 | 1.5 |
| Comparative example 2-5 | 15.0 | 25.1 | 14.5 | 24.6 | 617 | 243 | 45 | 13.9 | 1.7 |
| Comparative example 2-6 | 15.0 | 25.1 | 14.5 | 24.6 | 621 | 231 | 44 | 12.5 | 2 |
| Comparative example 2-7 | 1.8 | 20.7 | 1.6 | 20.5 | 629 | 239 | 44 | 10.4 | * |
| Comparative example 2-8 | 1.8 | 20.7 | 1.6 | 20.5 | 621 | 243 | 45 | 11.0 | * |

* Enough error rate cannot be obtained to measure adjacent track erasure.

Comparing the embodiments 2-1 to 2-3 and comparative examples 2-1 to 2-3, it is understood that the media of the embodiment have superior OW performances and a better S/N when the film thickness of the ferromagnetic-metal layer 46 is the same. It corresponds to a small saturation field (Hs) and a small dispersion of the switching field (Hs-Hc) of this embodiment. Although the comparative examples 2-4 to 2-6 where the film thickness of the ferromagnetic-metal layer 46 was increased up to 6 to 7 nm show a Hs, dispersion of switching field (Hs-Hc), and an S/N equal to the embodiments, the resolution thereof was deteriorated with increasing film thickness.

It is assumed that bit error rate (BER) is the (error bit count)/(read bit count) when data are recorded with a linear recording density of $4.33 \times 10^5$ bit per centimeter (433 kbit/cm, 1100 kbit/inch) and read with 108 bit (bit). When the bit error rates (BER: (error bit count)/(read bit count) when data of 108 bit are read out) were measured with a linear recording density of 433 kbit/cm, media of the embodiments 2-1 to 2-S and the comparative examples 2-4 to 2-6 had BER of 10-5 to 10-6($Log_{10}$ (BER)=–5 to –6). When data were recorded in plural tracks changing the track pitch under this linear recording density, the track pitch density was calculated from the track pitch when the off-track capability where the bit error rate is $10^{-3}$ or less becomes 30% of the aforementioned track pitch, the track pitch was about $8.66\times10^4$ track per centimeter (86.6 ktrack/cm, 220 ktrack/inch).

The bit error rate BER (1 time) of the adjacent track after recording data once in one track and the bit error rate BER (10000 times) of the adjacent track after recording data 10000 times in one track are measured by using the track pitch density obtained by the aforementioned method, and the amount of degradation of the bit error rate of the adjacent track (adjacent track erasure) was obtained from the logarithm of the ratio $Log_{10}$ (BER (10000 times)/BER (one time). As a result, in the comparative examples 2-4 to 2-6 which have thick ferromagnetic-metal layers, it is understood that the bit error rate in the adjacent track is greatly degraded. Since the ferromagnetic-metal film has a very strong exchange coupling inside the film compared with a granular film, the magnetic cluster size increases drastically though switching field distribution is decreased with increasing film thickness. Therefore, it is understood that the drastic degradation of the bit error rate in the adjacent track occurred under the strong influence of the adjacent track.

Comparing the embodiments 2-1 to 2-5, it is understood that one including boron in the ferromagnetic-metal layer 46 has a better S/N and the adjacent track erasure is suppressed. According to the evaluations of crystal grain size of the ferromagnetic-metal layer 46 by using TEM, crystal grains smaller than the magnetic layer 45 as shown in FIG. 12 are continuously grown in the embodiments 2-1 to 2-4 which include boron. On the other hand, it is understood that crystal grains of the ferromagnetic-metal layer 45 are grown as large grains and grown over grain boundaries of the magnetic layer 45 in the embodiment 2-6 which does not include boron. It is considered that the exchange coupling working in the lateral film direction of the ferromagnetic-metal layer 46 including boron is decreased by decreasing the crystal grain size of the ferromagnetic-metal layer and increasing the number of grain boundaries, so that the S/N is improved and the adjacent track erasure is suppressed. It is understood that the state where crystal grains smaller than the magnetic layer 45 grow continuously is more preferable for the crystal grains of the ferromagnetic-metal layer 46.

As a result of composition analysis in the film thickness direction by using photoelectron spectroscopy, the state where Cr oxide decreases gradually at the upper layer side of the magnetic layer 45 corresponding to stopping the introduction of oxygen gas during sputtering in the embodiments 2-1 to 2-5. And, as shown in Table 2, it is understood that element concentrations included in Cr oxide decreased to less than 5% in the region of the film thickness of about 2 nm at the interface side of the ferromagnetic-metal layer 46. On the other hand, in the comparative examples 2-1 to 2-6 formed under a constant oxygen concentration, the element concentration included in the Cr oxide is shown as high as 14.5% even in the region of the film thickness of about 2 nm at the interface side of the ferromagnetic-metal layer 46.

Figure 15:
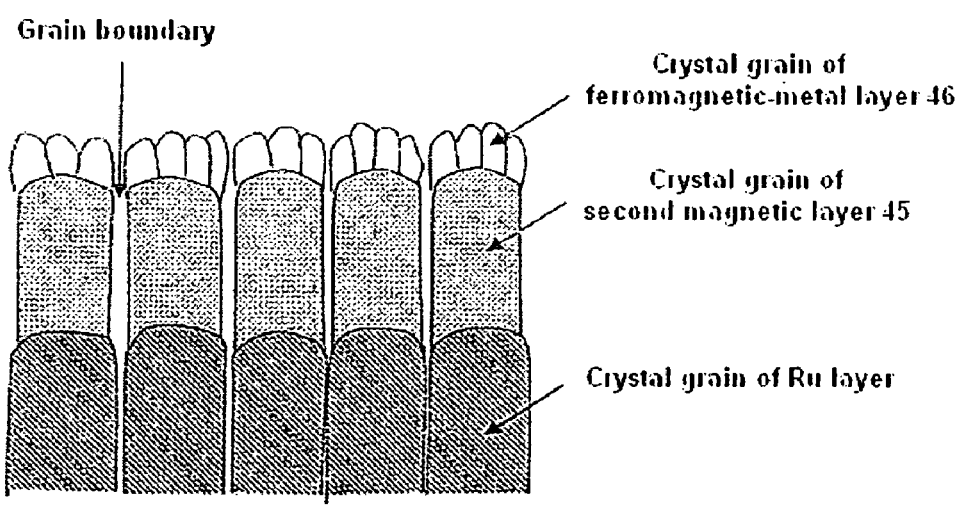
FIG. 15 is a schematic drawing illustrating a transmission electron microscope observation image of a cross-section of a medium of a comparative example.
Figure 16:
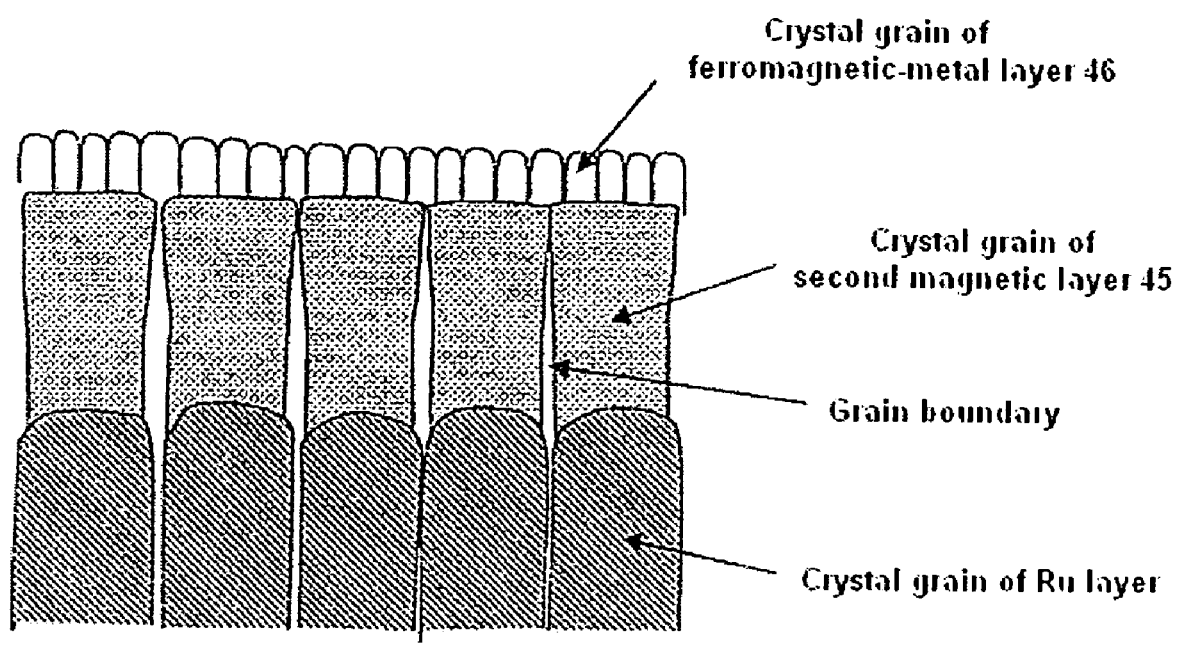
FIG. 16 is a schematic drawing illustrating a transmission electron microscope observation image of a cross-section of a medium according to embodiments of the present invention.

These samples were made as thin as several grains in the cross-sectional direction and the cross-sectional structures were analyzed by using TEM. As a result, it is understood that wide grain boundaries were observed up to the surface of the magnetic layer 45 as shown in FIG. 15 when the ferromagnetic-metal film is as thin as the comparative example 2-1, so that the ferromagnetic-metal layer 46 grown thereon has a discrete structure in the early stages of growth by being influenced by grain boundaries of the magnetic layer 45. On the other hand, it is understood that the grain boundary width at the upper layer side of the magnetic layer 45 becomes narrower with decreasing concentration of Cr oxide in the embodiments 2-1 to 2-5 as shown in FIG. 16, that the ferromagnetic-metal grains grown thereon are continuously grown over grain boundaries of the magnetic layer 45, and that the surface flatness becomes better compared with the comparative examples 2-1 to 2-6. That is, it is understood that a decrease in the concentration of Cr oxide at around the interface of the magnetic layer 45 at the ferromagnetic-metal layer 46 side is important to control the structure of the ferromagnetic-metal layer 46 and to introduce uniform exchange coupling therein.

Comparing the embodiments 2-1 to 2-3 with the comparative examples 2-7 to 2-8, media in the embodiments which have a high concentration of Cr oxide in the lower layer of the magnetic layer 45 have a better S/N. When only $SiO_2$ having a high free energy of oxide formation is increased, such as the comparative examples 2-7 and 2-8, although the crystal grain size thereof decreases, the dispersion of the grain size and grain boundary width increase by formation of a lot of subgrains. It is considered that the magnetic cluster size is increased because of strong exchange coupling between the subgrains, resulting in noise being increased. On the other hand, in the media of the embodiments, it is considered that the magnetic cluster size is decreased because of formation of wide and uniform grain boundaries, resulting in noise being decreased.

As the embodiments 2-6 to 2-8, media were manufactured where a CoRu alloy, a CoCr alloy, or CoCr—$SiO_2$ was inserted between the ferromagnetic-metal layer 46 and the magnetic layer 45 in the medium of embodiment 2-2 as a layer for controlling the interlayer exchanging coupling. As the comparative examples 2-9 to 2-11, media were manufactured where a CoRu alloy, a CoCr alloy, or CoCr—$SiO_2$ was inserted between the ferromagnetic-metal layer 46 and the magnetic layer 45 in the medium of the comparative example 2-1. Table 3 shows the compositions and film thicknesses of the layer inserted between the ferromagnetic-metal layer 46 and the magnetic layer 45 and the magnetic properties and the recording performances of the media.

[Table 3]

TABLE 3

| | Layer controlling exchange coupling between ferromagnetic-metal layer and magnetic layer | | Hs | Hs – Hc | OW | S/N | Adjacent track |
|---|---|---|---|---|---|---|---|
| | Target composition | Film thickness | (kA/m) | (kA/m) | (–dB) | (dB) | erasure |
| Embodiment 2-6 | 60 at. % Co—40 at. % Ru | 0.5 nm | 569 | 243 | 49 | 14.2 | 0.4 |
| Embodiment 2-7 | 65 at. % Co—35 at. % Cr | 0.6 nm | 565 | 235 | 48 | 14.5 | 0.5 |
| Embodiment 2-8 | 94[60 at. % Co—40 at. % Cr]—6 mol % $SiO_2$ | 1.2 nm | 569 | 251 | 49 | 14.0 | 0.6 |

TABLE 3-continued

| | Layer controlling exchange coupling between ferromagnetic-metal layer and magnetic layer | | Hs | Hs − Hc | OW | S/N | Adjacent track |
|---|---|---|---|---|---|---|---|
| | Target composition | Film thickness | (kA/m) | (kA/m) | (−dB) | (dB) | erasure |
| Comparative example 2-9 | 60 at. % Co—40 at. % Ru | 0.5 nm | 708 | 302 | 36 | 11.9 | * |
| Comparative example 2-10 | 65 at. % Co—35 at. % Cr | 0.6 nm | 700 | 298 | 37 | 12.0 | * |
| Comparative example 2-11 | 94[60 at. % Co—40 at. % Cr]—6 mol % $SiO_2$ | 1.2 nm | 716 | 318 | 35 | 11.7 | * |

* Enough error rate cannot be obtained to measure adjacent track erasure.

It is understood that a medium of this embodiment has excellent OW performances and a better S/N even when a layer controlling the exchange coupling between the upper and lower layers is inserted between the ferromagnetic-metal layer 46 and the magnetic layer 45. It corresponds to a small saturation field (Hs) and a small dispersion of the switching field (Hs-Hc) of this embodiment. Comparing the embodiment 2-2 with the embodiments 2-6 to 2-8, although the OW performances are improved by inserting a layer controlling the exchange coupling, the S/N and the tolerance of adjacent track erasure are slightly deteriorated. It is understood that this is due to matching with the write field of the head becoming worse when a layer controlling the exchange coupling such as a CoRu alloy, a CoCr alloy, CoCr—$SiO_2$, etc. is inserted and the switching field is further decreased by decreasing the exchange coupling between the magnetic layer 45 and the ferromagnetic-metal layer because the intensity and distribution of the switching field can be decreased by decreasing the grain boundary width and letting the crystal grains of the ferromagnetic-metal layer 46 grown thereon grow over the grain boundaries of the magnetic layer 45 with the gradients of the concentration of Cr oxide in the magnetic layer 45 and with decreasing the concentration of Cr oxide at the upper layer side. It is understood that it is not necessary to insert a layer controlling the exchange coupling when a sufficient write field can be obtained. On the other hand, according to the comparison between the comparative example 2-1 and the comparative examples 2-9 to 2-11, the OW was improved and the S/N was also improved by inserting a layer controlling the exchange coupling when the oxide concentration of the upper layer of the magnetic layer 45 is high. However, it is lower than the embodiment 2-2; it is understood that it is important to make the crystal grains of ferromagnetic-metal layer 46 grown on the magnetic layer 45 grow over the grain boundaries of the magnetic layer 45 continuously by decreasing the grain boundary width with the gradients of the concentration of Cr oxide in the magnetic layer 45 and with decreasing the concentration of Cr oxide at the upper layer side of the magnetic layer 45.

In the media of this embodiment, -Hn which becomes an index of thermal stability has a value of 159 kA/m or more and there is no thermal problem.

From the aforementioned results, it is understood that the same effect as the embodiment 1 can be obtained by decreasing oxygen while forming the upper side of the magnetic layer and decreasing the concentration of Cr oxide when the magnetic layer is manufactured in one chamber. Accordingly, the lower layer of the magnetic layer 45 has a structure where Cr oxide and at least one or more oxides selected from Si, Ti, Nb, and Ta are segregated to grain boundaries, and the upper layer of the magnetic layer 45 includes at least one or more oxides selected from Si, Ti, Nb, and Ta, in which the Cr oxide thereof is controlled to be less than the lower layer of the magnetic layer 45, thereby, it becomes clear that the film thickness of the ferromagnetic-metal layer 46 is decreased and the distribution of exchange coupling and switching field can be decreased by reducing the grain boundary width of the upper layer of the magnetic layer 45 and letting crystal grains of the ferromagnetic-metal layer 46 grown thereon grow over grain boundaries of the magnetic layer 45 continuously, resulting in deterioration of the bit error rate in the adjacent track being suppressed, and a high S/N and excellent thermal stability being achieved.

Embodiment 3

Figure 17:
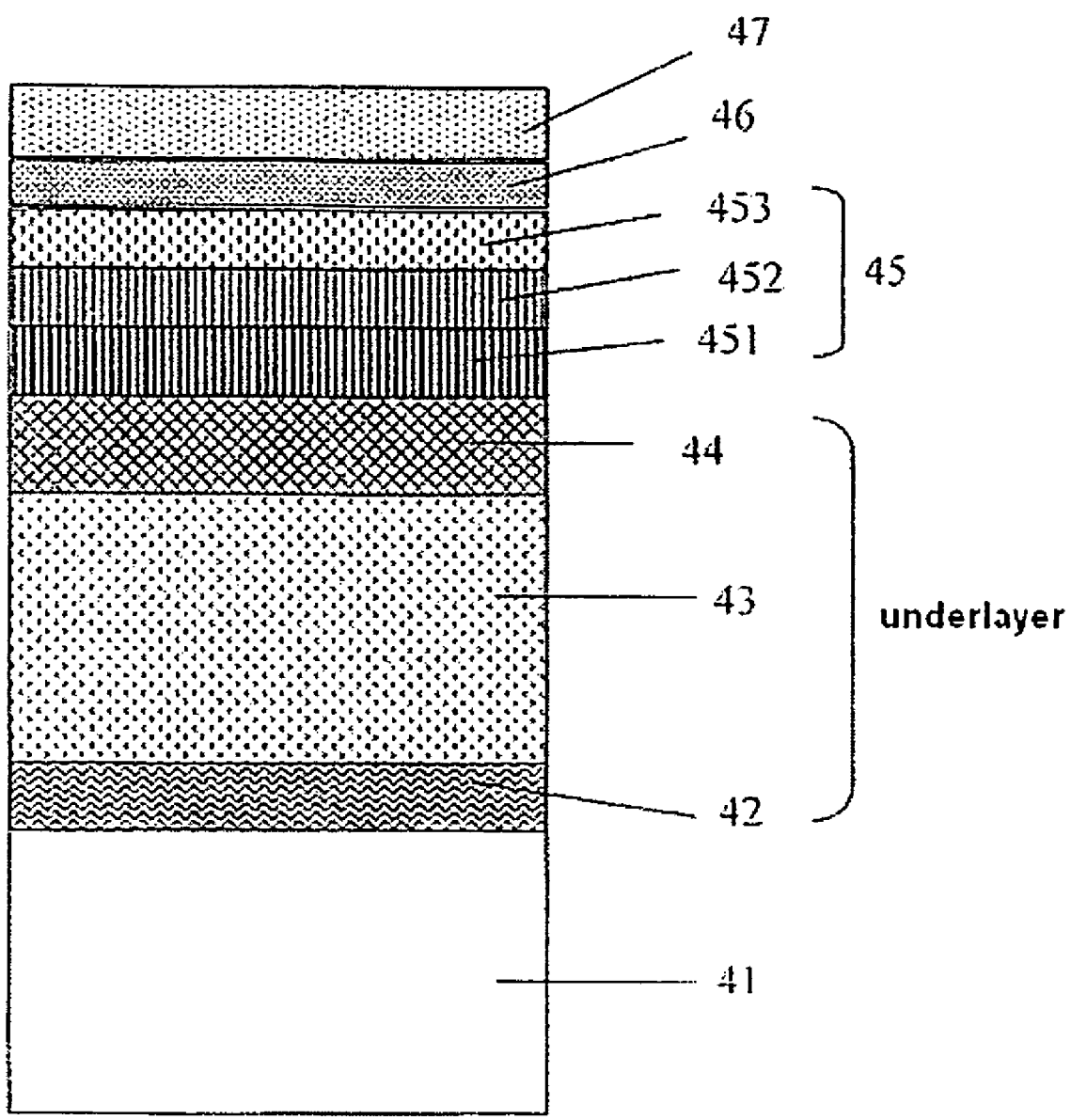
FIG. 17 is a cross-sectional drawing illustrating a structural example of perpendicular magnetic recording media according to embodiments of the present invention.

FIG. 17 is a schematic cross-sectional drawing illustrating a manufactured perpendicular magnetic recording medium. A perpendicular magnetic recoding medium of this embodiment is manufactured by using the same sputtering apparatus as in embodiment 1 and the same layer configuration and process conditions as in embodiment 1 were taken except for the magnetic layer 45 and the ferromagnetic-metal layer 46.

The magnetic layer 45 including an oxide has a three-layer stricture of the first magnetic layer 451, a second magnetic layer 452, and a third magnetic layer 453. The first magnetic layer 451 and the second magnetic layer 452 were deposited by using a composite target including a CoCrPt alloy and $SiO_2$ shown in Table 4 with a deposition rate of 3 nm/s. A 58 at. % Co-12 at. % Cr-18 at. % Pt-12 at. % B alloy was used for the ferromagnetic-metal layer 46 which does not include oxygen; argon was used for the sputter-gas, and the total gas pressure was controlled to be 0.6 Pa. The film thickness of the ferromagnetic-metal layer 46 was controlled to make the OW performances almost constant. Film thicknesses of the first, second, and third magnetic layers, compositions, total gas pressure, oxygen concentration, substrate bias condition, and film thickness of the ferromagnetic-metal layer 46 are shown in Table 4. Moreover, a comparative example where the first magnetic layer 451 or the second magnetic layer 452 is formed by using a composite target including less Cr and much $SiO_2$ under a low oxygen concentration to be a layer including less Cr oxide and much Si oxide and a comparative example where the third magnetic layer 453 is formed under an oxygen atmosphere and contains a lot of Cr oxide are manufactured and shown in Table 4. The target used for forming the third magnetic layer 453 was a composite target including [59 at. % Co-23 at. % Cr-18 at. % Pt] and $SiO_2$ with a ratio of 95 mol:5 mol and it is common to all the embodiments and comparative examples, so that the composition of the target was omitted in Table 4.

TABLE 4

| | First magnetic layer | | | | |
|---|---|---|---|---|---|
| | Target composition | Gas pressure | Oxygen | Film thickness | Bias |
| Embodiment 3-1 | 93[61 at. % Co—21 at. % Cr—18 at. % Pt]—7SiO$_2$ | 5 Pa | 2.7% | 9 nm | −275 V |
| Embodiment 3-2 | 95[61 at. % Co—21 at. % Cr—18 at. % Pt]—5SiO$_2$ | 5 Pa | 3.5% | 6 nm | −275 V |
| Embodiment 3-3 | 95[61 at. % Co—21 at. % Cr—18 at. % Pt]—5SiO$_2$ | 5 Pa | 3.5% | 6 nm | −275 V |
| Embodiment 3-4 | 92[63 at. % Co—19 at. % Cr—18 at. % Pt]—8SiO$_2$ | 5 Pa | 2.5% | 6 nm | −200 V |
| Comparative example 3-1 | 88[73 at. % Co—10 at. % Cr—18 at. % Pt]—12SiO$_2$ | 5 Pa | 1.5% | 9 nm | −275 V |
| Comparative example 3-2 | 88[73 at. % Co—10 at. % Cr—18 at. % Pt]—12SiO$_2$ | 5 Pa | 1.5% | 6 nm | −275 V |
| Comparative example 3-3 | 88[73 at. % Co—10 at. % Cr—18 at. % Pt]—12SiO$_2$ | 5 Pa | 1.5% | 6 nm | −275 V |
| Comparative example 3-4 | 88[73 at. % Co—10 at. % Cr—18 at. % Pt]—12SiO$_2$ | 5 Pa | 1.5% | 6 nm | −200 V |
| Comparative example 3-5 | 93[61 at. % Co—21 at. % Cr—18 at. % Pt]—7SiO$_2$ | 5 Pa | 2.7% | 9 nm | −275 V |
| Comparative example 3-6 | 95[61 at. % Co—21 at. % Cr—18 at. % Pt]—5SiO$_2$ | 5 Pa | 3.5% | 6 nm | −275 V |
| Comparative example 3-7 | 95[61 at. % Co—21 at. % Cr—18 at. % Pt]—5SiO$_2$ | 5 Pa | 3.5% | 6 nm | −275 V |
| Comparative example 3-8 | 92[63 at. % Co—19 at. % Cr—18 at. % Pt]—8SiO$_2$ | 5 Pa | 2.5% | 6 nm | −200 V |
| Comparative example 3-9 | 95[61 at. % Co—21 at. % Cr—18 at. % Pt]—5SiO$_2$ | 5 Pa | 3.5% | 5 nm | −275 V |

| | Second magnetic layer | | | | |
|---|---|---|---|---|---|
| | Target composition | Gas pressure | Oxygen | Film thickness | Bias |
| Embodiment 3-1 | 94[61 at. % Co—21 at. % Cr—18 at. % Pt]—6SiO$_2$ | 2 Pa | 0.0% | 2 nm | −275 V |
| Embodiment 3-2 | 95[61 at. % Co—21 at. % Cr—18 at. % Pt]—5SiO$_2$ | 5 Pa | 3.0% | 4 nm | −275 V |
| Embodiment 3-3 | 95[61 at. % Co—21 at. % Cr—18 at. % Pt]—5SiO$_2$ | 5 Pa | 3.7% | 4 nm | −275 V |
| Embodiment 3-4 | 92[65 at. % Co—17 at. % Cr—18 at. % Pt]—8SiO$_2$ | 5 Pa | 2.3% | 4 nm | −200 V |
| Comparative example 3-1 | 94[61 at. % Co—21 at. % Cr—18 at. % Pt]—6SiO$_2$ | 2 Pa | 0.0% | 2 nm | −275 V |
| Comparative example 3-2 | 95[61 at. % Co—21 at. % Cr—18 at. % Pt]—5SiO$_2$ | 5 Pa | 3.0% | 4 nm | −275 V |
| Comparative example 3-3 | 95[61 at. % Co—21 at. % Cr—18 at. % Pt]—5SiO$_2$ | 5 Pa | 3.7% | 4 nm | −275 V |
| Comparative example 3-4 | 92[65 at. % Co—17 at. % Cr—18 at. % Pt]—8SiO$_2$ | 5 Pa | 2.3% | 4 nm | −200 V |
| Comparative example 3-5 | 94[61 at. % Co—21 at. % Cr—18 at. % Pt]—6SiO$_2$ | 2 Pa | 0.0% | 2 nm | −275 V |
| Comparative example 3-6 | 95[61 at. % Co—21 at. % Cr—18 at. % Pt]—5SiO$_2$ | 5 Pa | 3.0% | 4 nm | −275 V |
| Comparative example 3-7 | 95[61 at. % Co—21 at. % Cr—10 at. % Pt]—5SiO$_2$ | 5 Pa | 3.7% | 4 nm | −275 V |
| Comparative example 3-8 | 92[65 at. % Co—17 at. % Cr—18 at. % Pt]—8SiO$_2$ | 5 Pa | 2.3% | 4 nm | −200 V |
| Comparative example 3-9 | 88[73 at. % Co—10 at. % Cr—18 at. % Pt]—12SiO$_2$ | 5 Pa | 1.5% | 4 nm | −275 V |

| | Third magnetic layer | | | | Ferromagnetic-metal layer |
|---|---|---|---|---|---|
| | Gas pressure | Oxygen | thickness | Bias | Film thickness |
| Embodiment 3-1 | 2 Pa | 0.0% | 2 nm | −275 V | 2 nm |
| Embodiment 3-2 | 2 Pa | 0.0% | 3 nm | −275 V | 3 nm |
| Embodiment 3-3 | 2 Pa | 0.0% | 3 nm | −275 V | 3.5 nm |
| Embodiment 3-4 | 2 Pa | 0.0% | 3 nm | −275 V | 4 nm |
| Comparative example 3-1 | 2 Pa | 0.0% | 2 nm | −275 V | 3 nm |
| Comparative example 3-2 | 2 Pa | 0.0% | 3 nm | −275 V | 4 nm |
| Comparative example 3-3 | 2 Pa | 0.0% | 3 nm | −275 V | 4.5 nm |
| Comparative example 3-4 | 2 Pa | 0.0% | 3 nm | −275 V | 5 nm |
| Comparative example 3-5 | 5 Pa | 3.5% | 2 nm | −275 V | 5.5 nm |
| Comparative example 3-6 | 5 Pa | 3.5% | 3 nm | −275 V | 6 nm |
| Comparative example 3-7 | 5 Pa | 3.5% | 3 nm | −275 V | 6.5 nm |

TABLE 4-continued

|  |  |  |  |  |  |  |  |  |
|---|---|---|---|---|---|---|---|---|
| Comparative example 3-8 | 5 Pa | | 3.5% | 3 nm | −275 V | | 6.3 nm | |
| Comparative example 3-9 | 2 Pa | | 0.0% | 3 nm | −275 V | | 4 nm | |

|  | First magnetic layer Cr oxide amount (at. %) | First magnetic layer Total oxide amount (at. %) | Second magnetic layer Cr oxide amount (at. %) | Second magnetic layer Total oxide amount (at. %) | Third magnetic layer Cr oxide amount (at. %) | Third magnetic layer Total oxide amount (at. %) | OW (−dB) | S/N (dB) | Adjacent track erasure |
|---|---|---|---|---|---|---|---|---|---|
| Embodiment 3-1 | 13.0 | 24.8 | 0.3 | 10.0 | 0.2 | 5.0 | 45 | 15.0 | 0.2 |
| Embodiment 3-2 | 18.5 | 26.9 | 16.0 | 24.4 | 0.3 | 8.4 | 44 | 14.0 | 0.3 |
| Embodiment 3-3 | 18.5 | 26.9 | 19.5 | 27.9 | 0.3 | 8.4 | 43 | 14.4 | 0.35 |
| Embodiment 3-4 | 10.8 | 24.3 | 8.0 | 20.9 | 0.3 | 8.4 | 43 | 13.6 | 0.5 |
| Comparative example 3-1 | 1.8 | 20.7 | 0.3 | 10.0 | 0.2 | 5.0 | 44 | 11.2 | * |
| Comparative example 3-2 | 1.8 | 20.7 | 16.0 | 24.4 | 0.3 | 8.4 | 44 | 10.9 | * |
| Comparative example 3-3 | 1.8 | 20.7 | 19.5 | 27.9 | 0.3 | 8.4 | 43 | 10.7 | * |
| Comparative example 3-4 | 1.8 | 20.7 | 7.0 | 20.9 | 0.3 | 8.4 | 44 | 10.4 | * |
| Comparative example 3-5 | 13.0 | 24.8 | 0.3 | 10.0 | 19.0 | 27.4 | 42 | 14.5 | 1.1 |
| Comparative example 3-6 | 18.5 | 26.9 | 16.0 | 24.4 | 19.0 | 27.4 | 44 | 13.6 | 1.3 |
| Comparative example 3-7 | 18.5 | 26.9 | 19.5 | 27.9 | 19.0 | 27.4 | 44 | 14.0 | 1.6 |
| Comparative example 3-8 | 10.8 | 24.3 | 8.0 | 20.9 | 19.0 | 27.4 | 43 | 13.4 | 1.5 |
| Comparative example 3-9 | 18.5 | 26.9 | 1.8 | 20.7 | 0.3 | 8.4 | 43 | 11.4 | * |

* Enough error rate cannot be obtained to measure adjacent track erasure.

According to a comparison between the embodiments 3-1 to 3-4 and the comparative examples 3-1 to 3-4, it is understood that a high S/N can be obtained by including a lot of Cr oxide in the first magnetic layer in addition to Si oxide. A sample where layers from the second magnetic layer 452 to the ferromagnetic-metal layer 46 were not formed was manufactured and the structure was observed by using TEM. As a result, in a sample corresponding to the embodiment which includes a lot of Cr oxide, wide and uniform grain boundaries were observed, and, on the other hand, many subgrains with narrow grain boundaries were observed in a sample including a lot of Si oxide which has a high free energy of oxide formation and less Cr oxide. Since the exchange coupling working between subgrains is strong in the comparative examples 3-1 to 3-4, the magnetic cluster size does not become smaller and the S/N cannot be improved. On the other hand, it is considered that grain boundaries was increased uniformly by making the first magnetic layer a granular film which includes a lot of Cr oxide in addition to Si oxide; the magnetic cluster size can be decreased by decreasing the exchange coupling uniformly, and the S/N can be improved.

Moreover, according to comparison of the embodiments 3-1 to 3-4 with the comparative examples 3-5 to 3-8, since the film thickness of the ferromagnetic-metal layer 46 necessary to obtain the same OW performances as this embodiment became thicker when the Cr oxide concentration in the third magnetic layer 453 adjacent to the ferromagnetic-metal layer became higher, the resolution was greatly decreased and the medium S/N was decreased. Furthermore, the degradation of the bit error rate of the adjacent track (adjacent track erasure) is greatly increased when signals are recorded in one track. Since the exchange coupling in the ferromagnetic-metal film is much stronger than that in the granular film, the magnetic cluster size increases rapidly though switching field distribution is decreased with increasing film thickness. Therefore, it is understood that the adjacent track erasure occurred under the strong influence of the adjacent track.

Moreover, according to a comparison of the embodiments 3-2 to 3-4 with the comparative example 3-9, it is understood that it is important to include Si oxide and to have a high concentration of Cr oxide even around the center of the magnetic layer 45 in like manner as around the initial layer of the magnetic layer 45. There is no problem if the sum of the element concentrations included in Cr oxide at around the center thereof is from 7 at. % to 20 at. %. When it is in this range, it is understood that there is no problem even if the concentration of the oxide changes compared with the initial layer (the first magnetic layer 451) of the magnetic layer 45.

Moreover, it is not preferable that the ratio of the lower layer of the magnetic layer where a lot of Cr oxide is included and the grain boundary width is wide becomes less than half in the magnetic layer 45 because the exchange coupling in the magnetic layer cannot be sufficiently decreased. However, when the first magnetic layer 451 including a high concentration of Cr oxide like the embodiment 3-1, it is understood that both the second magnetic layer 452 and the third magnetic layer 453 can be made a film where Si oxide is included and Cr oxide is hardly included.

If the aforementioned conditions are satisfied, the magnetic layer 45 may consist of four layers or more and gradients in the oxygen concentration may be made in each of the separated magnetic layers.

In a medium in this embodiment, -Hn which becomes an index of thermal stability has a value of 159 kA/m or more and there is no thermal problem.

FIG. 18 is a schematic drawing illustrating a magnetic storage apparatus. FIG. 18(a) is a plane schematic drawing and FIG. 18(b) is a cross-sectional schematic drawing. The magnetic recording medium 10 consists of perpendicular magnetic recording media as described above in the embodiments 1 to 3, and the magnetic storage apparatus includes a medium driving part 11 which drives this magnetic recording medium, a magnetic head 12 having a recording part and a reading part, an actuator 13 which makes the magnetic head move relative to the magnetic recording medium, and a signal processing system for input/output signals to the magnetic head.

Figure 19:
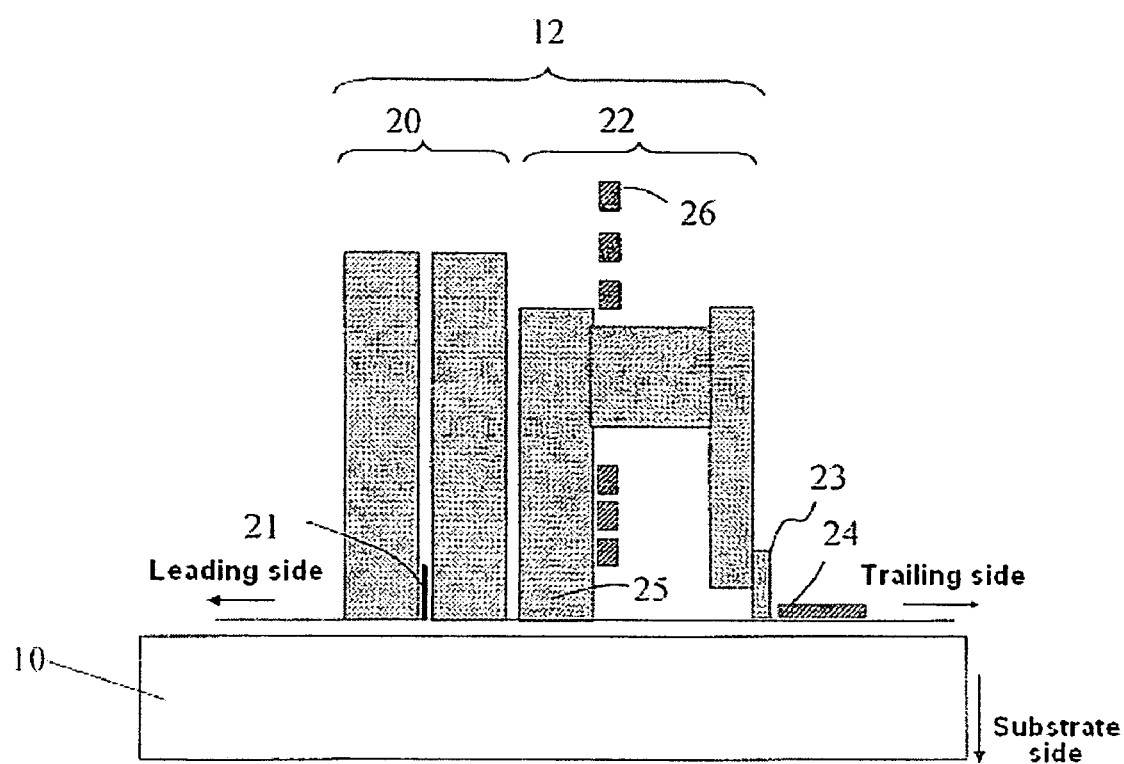
FIG. 19 is a schematic drawing illustrating a relationship between a magnetic head and a magnetic recording medium.

FIG. 19 illustrates a relationship between the magnetic head 12 and the magnetic recording medium 10. The magnetic flying height of the magnetic head 12 is controlled to be 4 nm, a tunneling magnetoresistive element (TMR) is used for the read element 21 of the reading unit 20, and the shield gap length and the track width are controlled to be 50 nm and 50 nm, respectively. A wrap around shield 24 is formed around the main pole 23 of the recording unit 22, and the geometrical track width of the tip of the main pole is controlled to be 80 nm, the gap between the main pole and trailing shield 50 nm, and the gap between the main pole and side shield 80 nm. The main pole 23, the soft-magnetic underlayer of the perpendicular magnetic recording medium 10, and the auxiliary pole 25 constitute a magnetic circuit, and magnetic flux generated from the main pole 23 by sending an electric current to the thin film conductor coil 26, which makes an interlinkage with the magnetic circuit, passing through the magnetic layer and the soft-magnetic underlayer of the perpendicular magnetic recording medium 10 and returning to the auxiliary pole 25.

Operation at 40.9 gigabits per square centimeter was able to be ensured by controlling the track pitch density per centimeter to be 86614 tracks and the linear recording density per centimeter to be 472441 bits by using a medium according to embodiments of the present invention, and the adjacent track erasure can be ensured to have a level (1 or less) where there are no problems in practical use. Moreover, in combination with the medium of the embodiment 2-2, operation at 46.7 gigabits per square centimeter was able to be ensured by controlling the track pitch density per centimeter to be 87795 tracks and the linear recording density per centimeter to be 531496 bits, and the adjacent track erasure can be ensured to have a level (1 or less) where there are no problems in practical use.

What is claimed is:

1. A perpendicular magnetic recording medium comprising:
an underlayer provided over a substrate;
a magnetic layer formed over said underlayer, in which magnetic grains comprising Co, Cr, and Pt with columnar structure and oxides are contained; and
a ferromagnetic-metal layer which is formed over said magnetic layer and which does not contain an oxide,
wherein said magnetic layer comprises at least two layers including a first magnetic layer formed at an underlayer side of the magnetic layer and a second magnetic layer formed at a ferromagnetic-metal layer side of the magnetic layer, in which grain boundaries of said first magnetic layer include a Cr oxide and at least one oxide selected from Si, Ti, Nb, and Ta, and grain boundaries of said second magnetic layer include at least one oxide selected from Si, Ti, Nb, and Ta where the sum of element concentrations of Cr and oxygen in any Cr oxide in the second magnetic layer is smaller than that in said first magnetic layer and is greater than 0 at % and less than 5 at %.

2. The perpendicular magnetic recording medium according to claim 1, wherein
the grain boundary width of said second magnetic layer is narrower than the grain boundary width of said first magnetic layer, wherein a thickness of the ferromagnetic-metal layer is between about 1 nm and about 5 nm.

3. The perpendicular magnetic recording medium according to claim 1, wherein
crystal grains of said ferromagnetic-metal layer and crystal grains of said second magnetic layer exist with a correspondence of 1 to many or many to 1, and crystal grains of said ferromagnetic-metal layer have a structure continuously grown over grain boundaries of said second magnetic layer.

4. The perpendicular magnetic recording medium according to claim 1, wherein
crystal grains of said ferromagnetic-metal layer are smaller than crystal grains of said second magnetic layer.

5. The perpendicular magnetic recording medium according to claim 1, wherein
the sum of concentrations of Cr element and oxygen element in the Cr oxide of the second magnetic layer is 4.3 at. % or less in the region of film thickness of about 2 nm from the ferromagnetic-metal layer side of the magnetic layer.

6. The perpendicular magnetic recording medium according to claim 1, wherein
the sum of concentrations of Cr element and oxygen element contained in the Cr oxide is 7 at. % or more and 20 at. % or less in the region of film thickness of about 4 nm from the substrate side of the magnetic layer.

7. The perpendicular magnetic recording medium according to claim 1, wherein
the total amount of each element contained in the oxide of said second magnetic layer is 3.6 at. % or more and 13 at. % or less.

8. The perpendicular magnetic recording medium according to claim 1, wherein
the total amount of each element contained in the oxide of said first magnetic layer is 15 at. % or more and 30 at. % or less.

9. The perpendicular magnetic recording medium according to claim 1,
wherein
a CoRu alloy layer, a CoCr alloy layer, or a layer which has a granular structure of CoCr and $SiO_2$ is provided between said second magnetic layer and said ferromagnetic-metal layer.

10. A perpendicular magnetic recording medium comprising:
an underlayer provided over a substrate;
a magnetic layer formed over said underlayer, in which magnetic grains comprising Co, Cr, and Pt with columnar structure and oxides are contained;
a ferromagnetic-metal layer which is formed over said magnetic layer and which does not contain an oxide,
wherein said magnetic layer comprises a Cr oxide in grain boundaries thereof, wherein the Cr oxide has a concentration gradient that varies in a film thickness direction of the magnetic layer from an underlayer side of the magnetic layer towards a ferromagnetic-metal layer side of the magnetic layer, wherein the magnetic layer includes the Cr oxide and at least one oxide selected from Si, Ti, Nb, and Ta, where the sum of element concentrations of Cr and oxygen contained in the Cr oxide decreases from the underlayer side to the ferromagnetic-metal layer side to less than 5 at. %, wherein the magnetic layer has no clear separate layer structure.

11. The perpendicular magnetic recording medium according to claim 10, wherein
the grain boundary width of said magnetic layer at said ferromagnetic-metal layer side is narrower than the grain boundary width from the interface at said underlayer side.

12. The perpendicular magnetic recording medium according to claim 10, wherein
crystal grains of said ferromagnetic-metal layer and crystal grains of said magnetic layer exist with a correspondence of 1 to many or many to 1, and crystal grains of said ferromagnetic-metal layer have a structure continuously grown over grain boundaries of said magnetic layer.

13. The perpendicular magnetic recording medium according to claim 10, wherein
crystal grains of said ferromagnetic-metal layer are smaller than crystal grains of said magnetic layer.

14. The perpendicular magnetic recording medium according to claim 10, wherein
the sum of the concentrations of Cr element and oxygen element contained in the Cr oxide is 4.3 at. % or less in the region of film thickness of about 2 nm from the ferromagnetic-metal layer side.

15. The perpendicular magnetic recording medium according to claim 10, wherein
the sum of the concentrations of Cr element and oxygen element contained in the Cr oxide is 7 at. % or more and 20 at. % or less in the region of film thickness of about 4 nm from the underlayer side.

16. The perpendicular magnetic recording medium according to claim 10, wherein
the total amount of each element contained in the oxide in the region of said magnetic layer at said ferromagnetic metallic side is 3.6 at. % or more and 13 at. % or less.

17. The perpendicular magnetic recording medium according to claim 10, wherein
the total amount of each element contained in the oxide in the region of said magnetic layer at said underlayer side is 15 al. % or more and 30 al. % or less.

18. The perpendicular magnetic recording medium according to claim 10, wherein
a CoRu alloy layer, a CoCr alloy layer, or a layer having a granular structure of CoCr and Si02 is provided between said magnetic layer and said ferromagnetic-metal layer.

19. A magnetic storage apparatus comprising:
perpendicular magnetic recording media comprising;
an underlayer provided over a substrate;
a magnetic layer formed over said underlayer, in which magnetic grains comprising Co, Cr, and Pt with columnar structure and oxides are contained; and
a ferromagnetic-metal layer which is formed over said magnetic layer and which does not contain an oxide,
wherein said magnetic layer comprises at least two layers including a first magnetic layer formed at said underlayer side and a second magnetic layer formed at said ferromagnetic-metal layer side, in which grain boundaries of said first magnetic layer include a Cr oxide and at least one oxide selected from Si, Ti, Nb, and Ta, and grain boundaries of said second magnetic layer include at least one oxide selected from Si, Ti, Nb, and Ta where the sum of element concentrations of Cr and oxygen contained in the Cr oxide is smaller than that in said first magnetic layer and is greater than 0 at % and less than 5 at. %, wherein crystal grains of said ferromagnetic-metal layer and crystal grains of said magnetic layer exist with a correspondence of 1 to many or many to 1, and crystal grains of said ferromagnetic-metal layer have a structure continuously grown over grain boundaries of said magnetic layer;
a unit for driving said perpendicular magnetic recording medium in the recording direction;
a magnetic head having a write head and read head;
a unit for driving said magnetic head relative to said perpendicular magnetic recording medium; and
a signal processing unit for processing input signals and output signals to said magnetic head.

* * * * *